(12) United States Patent
Elshafie et al.

(10) Patent No.: US 12,426,066 B2
(45) Date of Patent: Sep. 23, 2025

(54) TRANSMISSION ACROSS PARTITIONED RESOURCE POOLS

(71) Applicant: QUALCOMM Incorporated, San Diego, CA (US)

(72) Inventors: Ahmed Elshafie, San Diego, CA (US); Ahmed Attia Abotabl, San Diego, CA (US); Hung Dinh Ly, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/178,446

(22) Filed: Mar. 3, 2023

(65) Prior Publication Data

US 2024/0298336 A1 Sep. 5, 2024

(51) Int. Cl.
*H04W 72/25* (2023.01)
*H04L 5/00* (2006.01)
*H04W 72/0446* (2023.01)

(52) U.S. Cl.
CPC .......... *H04W 72/25* (2023.01); *H04L 5/0012* (2013.01); *H04W 72/0446* (2013.01)

(58) Field of Classification Search
CPC .. H04W 72/25; H04W 72/0446; H04L 5/0012
See application file for complete search history.

(56) References Cited

U.S. PATENT DOCUMENTS

2019/0044667 A1 2/2019 Guo et al.
2022/0312386 A1* 9/2022 Sun ................. H04L 5/0012
(Continued)

FOREIGN PATENT DOCUMENTS

EP 3985900 A1 4/2022

OTHER PUBLICATIONS

F. Romeo, C. Campolo, A. O. Berthet and A. Molinaro, "Improving the DENM Reliability over 5G-V2X Sidelink through Repetitions and Diversity Combining," 2021 IEEE 4th 5G World Forum (5GWF), Montreal, QC, Canada, 2021, pp. 352-357, doi: 10.1109/5GWF52925.2021.00068. (Year: 2021).*

(Continued)

*Primary Examiner* — Melvin C Marcelo
(74) *Attorney, Agent, or Firm* — Paul M. McAdams; Polsinelli LLP

(57) ABSTRACT

Apparatus, methods, and computer program products for wireless communication are provided. An example method may include transmitting, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. The example method may further include transmitting, to the second network entity, the first PSSCH transmission including a first instance of sidelink information based on the frequency hopping pattern. The example method may further include transmitting, to the second network entity, the second PSSCH transmission including a second instance of the sidelink information based on the frequency hopping pattern.

30 Claims, 15 Drawing Sheets

(56) References Cited

U.S. PATENT DOCUMENTS

2024/0040568 A1\* 2/2024 Elshafie ............ H04W 72/0446
2024/0297697 A1\* 9/2024 Elshafie ............... H04B 7/0626

OTHER PUBLICATIONS

International Search Report and Written Opinion—PCT/US2024/016718—ISA/EPO—Jul. 2, 2024.
Nokia., et al., "On SCI Contents", 3GPP Draft, 3GPP TSG RAN WG1 Meeting #85, R1-165046, 3rd Generation Partnership Project, Mobile Competence Centre, 650, Route Des Lucioles, F-06921 Sophia-Antipolis Cedex, France, vol. RAN WG1, No. Nanjing, China, May 23, 2016-May 27, 2016, May 14, 2016, XP051096285, pp. 1-6, Sect. 2.1.

\* cited by examiner

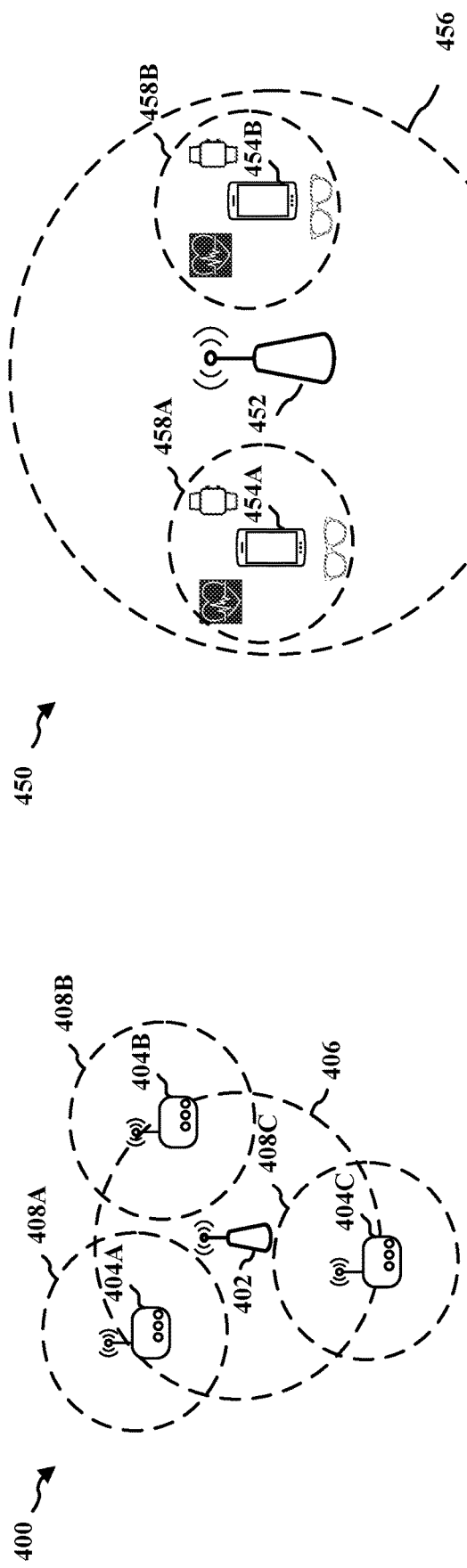
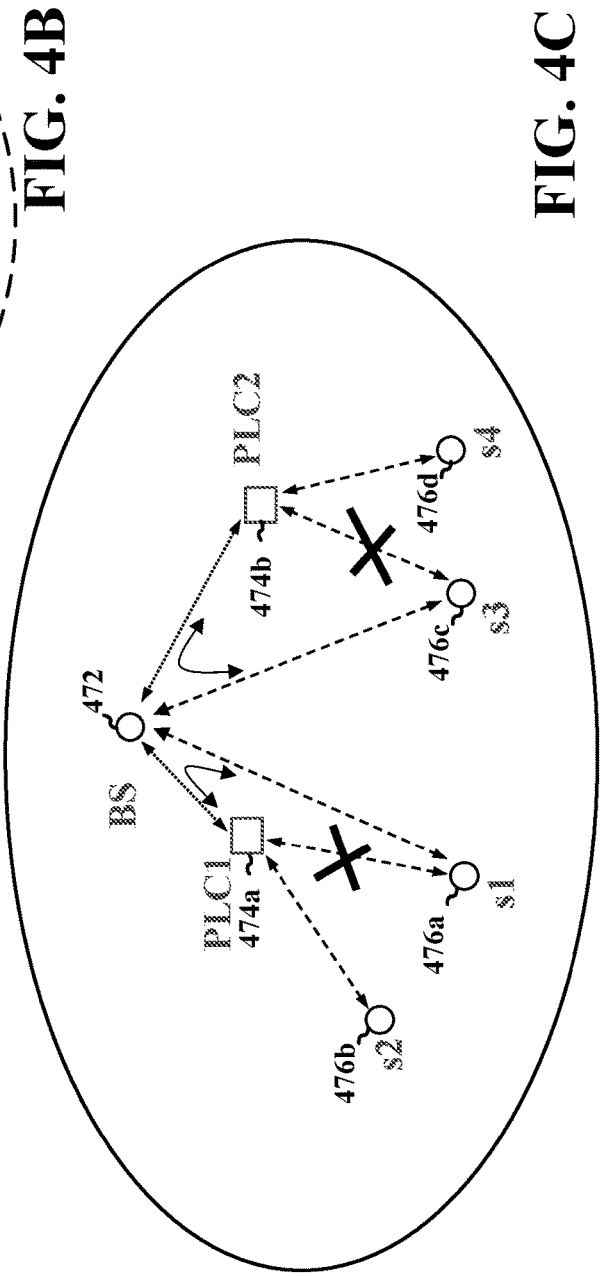
FIG. 4A
FIG. 4B
FIG. 4C

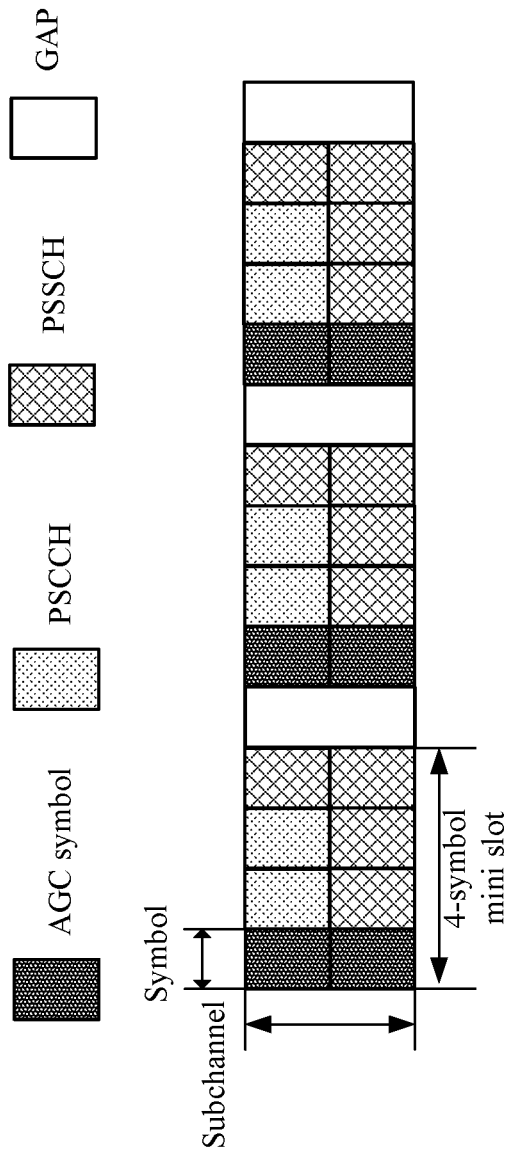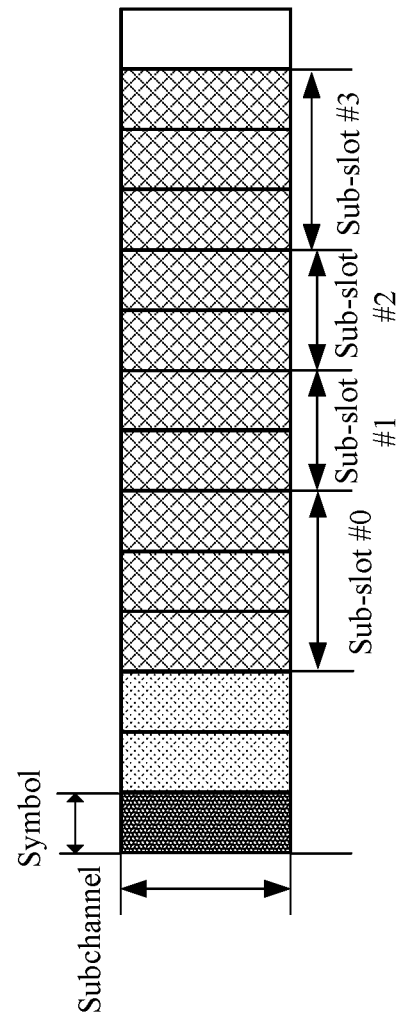
FIG. 5A
FIG. 5B

TRANSMISSION ACROSS PARTITIONED RESOURCE POOLS

TECHNICAL FIELD

The present disclosure relates generally to communication systems, and more particularly, to wireless communication systems with sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus, which may be a first network entity, such as a first user equipment (UE), are provided. The apparatus may include a memory and at least one processor coupled to the memory. The at least one processor may be configured to transmit, to a second network entity, a repetition configuration associated with a first physical sidelink control channel (PSSCH) transmission and a second PSSCH transmission, where the repetition configuration includes information indicative of a frequency hopping pattern associated with the first PSSCH transmission and the second PSSCH transmission. The at least one processor may be configured to transmit, to the second network entity, the first PSSCH transmission including a first instance of sidelink information based on the frequency hopping pattern. The at least one processor may be configured to transmit, to the second network entity, the second PSSCH transmission including a second instance of the sidelink information based on the frequency hopping pattern.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A is a diagram illustrating an example of sidelink (SL) relay.

FIG. 4B is a diagram illustrating another example of SL relay.

FIG. 4C is a diagram illustrating example traffic between programmable logic controller (PLC), gNB, and other devices.

FIG. 5A is a diagram illustrating an example of SL mini-slot within a slot.

FIG. 5B is a diagram illustrating an example of SL sub-slot within a slot.

DETAILED DESCRIPTION

Figure 1:
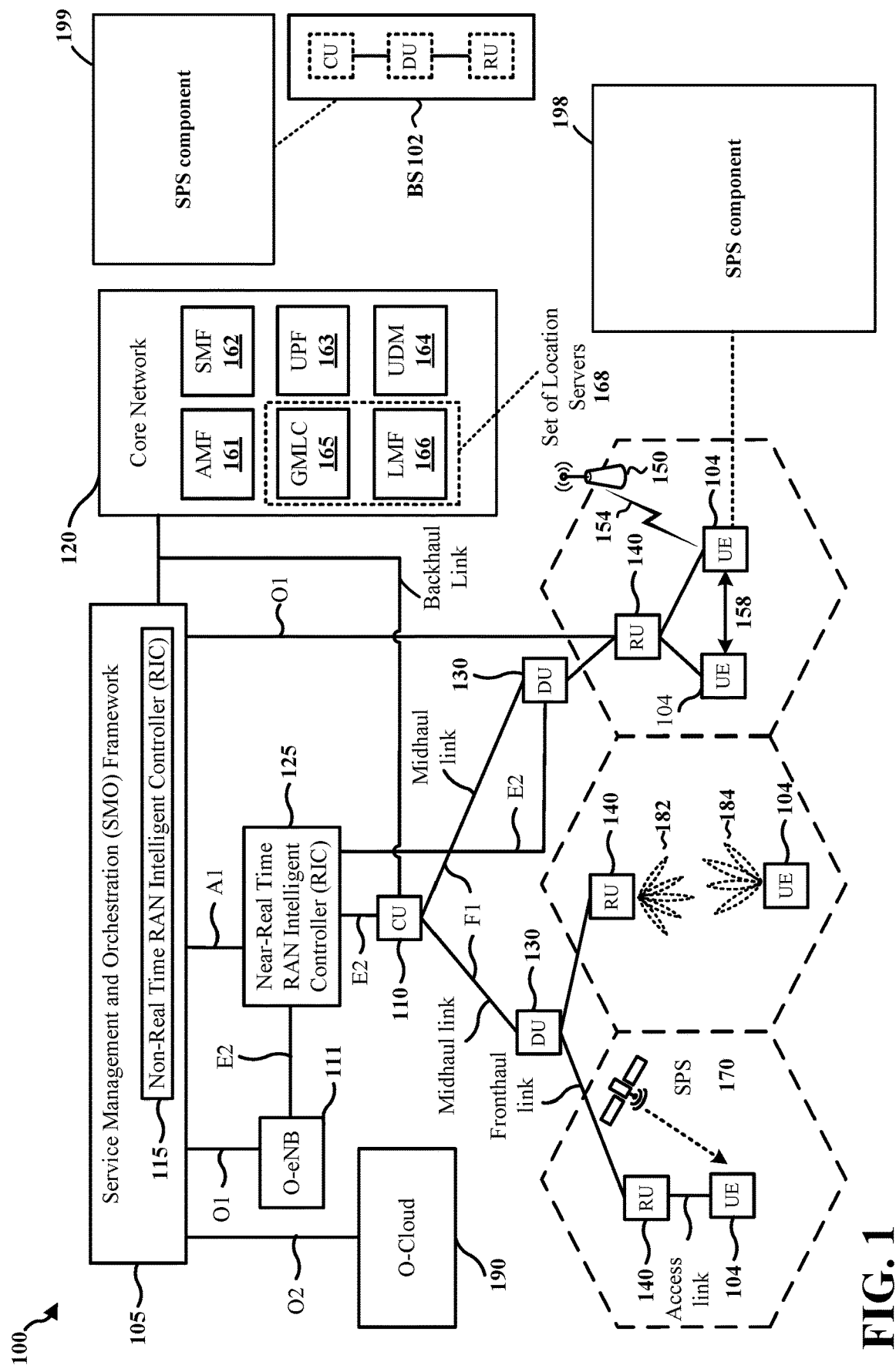
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU)

(including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a repetition component 198. In some aspects, the repetition component 198 may be configured to transmit, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. In some aspects, the repetition component 198 may be further configured to transmit, to the second network entity, the first PSSCH transmission including a first instance of sidelink information based on the frequency hopping pattern. In some aspects, the repetition component 198 may be further configured to transmit, to the second network entity, the second PSSCH transmission including a second instance of the sidelink information based on the frequency hopping pattern.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
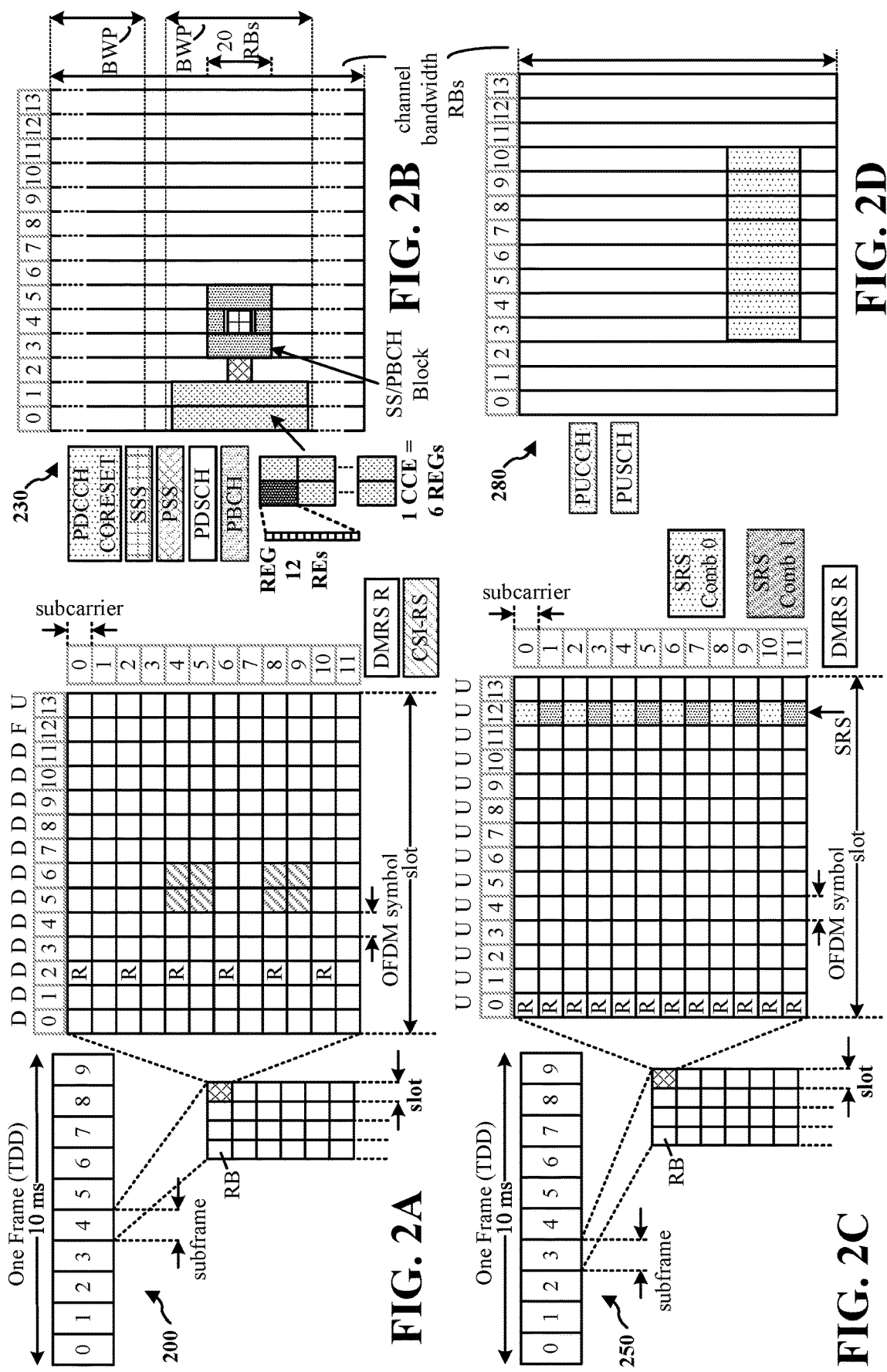
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 KHz. and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
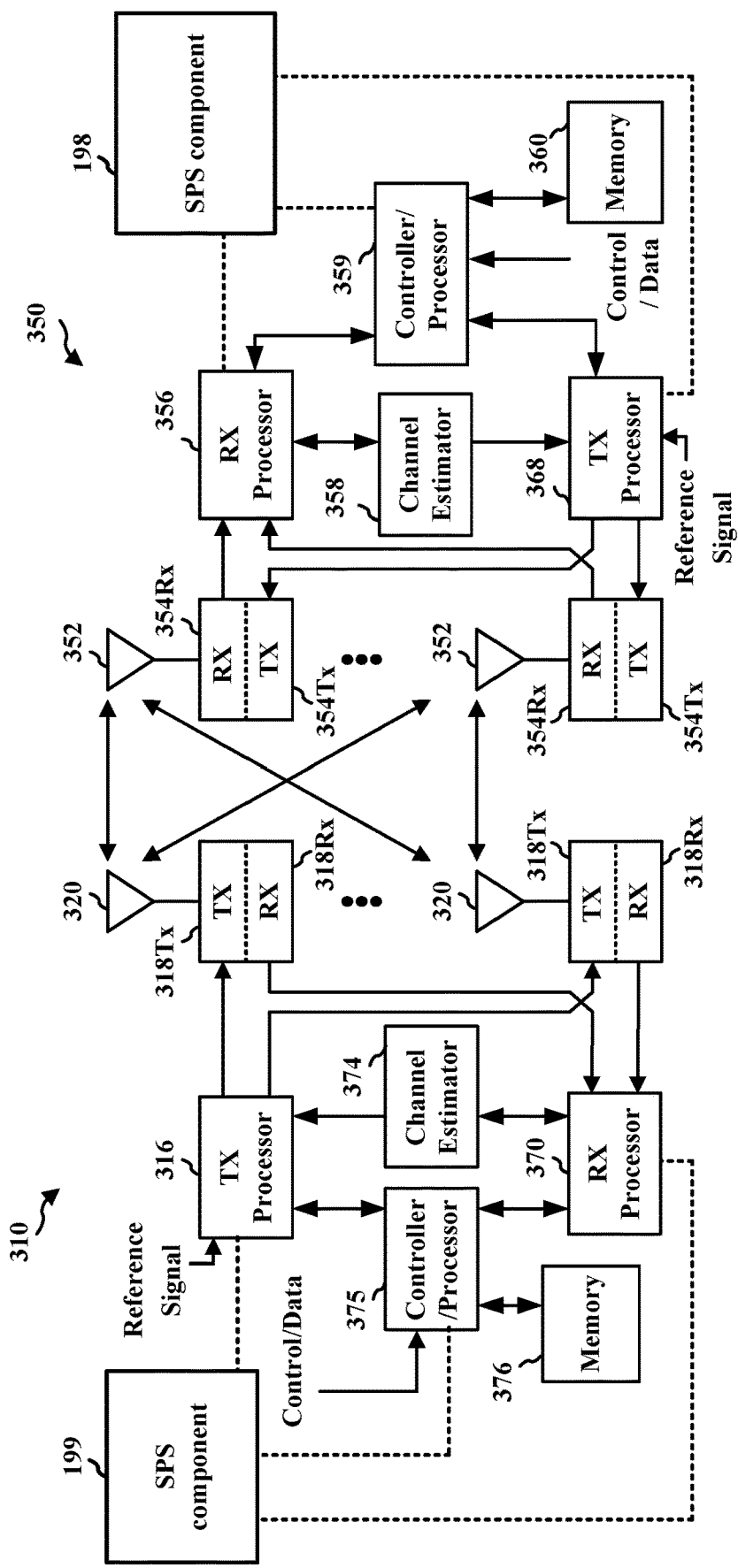
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ. priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with repetition component 198 of FIG. 1.

Sidelink communication may use a set of time/frequency resources defined by a resource pool. A wireless device (e.g., UE) may be configured by higher layers with one or more sidelink resource pools. A sidelink resource pool may be for transmission of PSSCH or the reception of PSSCH.

In some wireless communication systems, two resource allocation modes may be supported for sidelink communications. A sidelink resource pool may be associated with either of the two resource allocation modes. Under the first resource allocation mode (resource allocation mode 1), the sidelink resources may be either indicated by a base station dynamically via downlink control information (DCI) format 3_0 or configured. Both Type 1 (configuration based) and Type 2 (activation based) sidelink resource configurations may be supported. Under the second mode (resource allocation mode 2), the UE may select its sidelink transmission resource(s) to be used by the UE for the sidelink transmission(s), e.g., without scheduling from the base station. A UE may determine the sidelink transmission resource(s) based on sensing and resource reservation. In some examples, the mode 2 resource allocation may be referred to as a sensing-based resource allocation for sidelink transmissions.

In the frequency domain, a sidelink resource pool may include a number (numSubchannel) of contiguous sub-channels. A sub-channel may include a number (subchannelsize) of contiguous PRBs. The number of contiguous sub-channels and the number of contiguous PRBs may be higher layer parameters.

In the resource allocation mode 2, a higher layer may request the UE to determine a subset of resources from which the higher layer may select resources for PSSCH/PSCCH transmissions. To trigger resource selection at a slot n, the higher layer may provide a number of parameters including a t2min_SelectionWindow (internal $T_{2min}$ may be set to a corresponding value from higher layer parameter t2min_SelectionWindow for a given value of $prior_{TX}$ that indicates configured priority $\{1, 5, 10, 20\} \cdot 2^\mu$ where $\mu$ may equal to 0, 1, 2, 3, for subcarrier spacing (SCS) 15, 30, 60, 120, kHz.

If $T_{2min}$ is shorter than a remaining packet delay budget (PDB) (in slots), then $T_2$ may be determined by the UE 104 and $T_{2min}$ may be less than or equal to $T_2$ which may be less than or equal to the remaining packet delay budget. If $T_{2min}$ is not shorter than a remaining packet delay budget, resource selection window size $T_2$ may be set to the remaining packet delay budget. The parameters may further include a t0_SensingWindow where an internal parameter To indicating the sensing window size (T_0) that may be the number of slots corresponding to t0_Sensing Window ms. The sensing window may be defined by a range of slots $[n-T_0, n-T_{proc,0}^{SL})$ where $T_{proc,0}^{SL}$ (T_proc, 0) may be defined. The UE may monitor slots which may belong to a sidelink resource pool within the sensing window except for those in which its own transmissions occur. The UE may decode the SCIs received from other UEs in the sensing window. Each UE may attempt to reserve resources in the future that collides with the resource selection window of the UE of interest. Based on a priority of the packet for which another UE is reserving a resource (pj), the priority of the packet of the UE of interest (pi), the configured reference signal received power (RSRP) for the (pi,pj) pair, and the measured RSRP by the UE of interest-based on the reception of PSCCH/PSSCH from the other UE, the UE of interest may determine whether a candidate resource is considered as available or not (i.e., considered as candidate resources for selection).

In addition to higher capability devices wireless communication may support reduced capability devices. Among others, examples of higher capability devices include premium smartphones, V2X devices, URLLC devices, eMBB devices, etc. Among other examples, reduced capability devices may include wearables, industrial wireless sensor networks (IWSN), surveillance cameras, low-end smartphones, etc. For example, NR communication systems may support both higher capability devices and reduced capability devices. A reduced capability device may be referred to as an NR light device, a low-tier device, a lower-tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In some examples, a reduced capability UE may have an uplink transmission power of at least 10 dB less than that of a higher capability UE. As another example, a reduced capability UE may have reduced transmission bandwidth or reception bandwidth than other UEs. For instance, a reduced capability UE may have an operating bandwidth between 5 MHz and 20 MHz for both transmission and reception, in contrast to other UEs which may have a bandwidth of up to 100 MHz. As a further example, a reduced capability UE may have a reduced number of reception antennas in comparison to other UEs. For instance, a reduced capability UE may have a single receive antenna and may experience a lower equivalent receive signal to noise ratio (SNR) in comparison to higher capability UEs that may have multiple antennas. Reduced capability UEs may also have reduced computational complexity than other UEs.

It may be helpful for communication to be scalable and deployable in a more efficient and cost-effective way. For example, it may be possible to relax or reduce peak throughput, latency, and/or reliability specifications for the reduced capability devices. In some examples, reductions in power consumption, complexity, production cost, and/or reductions in system overhead may be prioritized. As an example, industrial wireless sensors may have an acceptable up to approximately 100 ms. In some safety-related applications, the latency of industrial wireless sensors may be acceptable up to 10 ms or up to 5 ms. The data rate may be lower and may include more uplink traffic than downlink traffic. As another example, video surveillance devices may have an acceptable latency of up to approximately 500 ms.

To facilitate scalable and deployable communications, multiple types of reduced capability devices may be introduced. For example, a reduced capability device for URLLC/eMBB may have more stringent specifications on peak throughput, latency, and reliability than a light reduced capability device which may in turn have more stringent specifications than a superlight reduced capability device. On the other hand, a superlight reduced capability device may have improved coverage, complexity, and power consumption compared to a light reduced capability device which may in turn have improved coverage, complexity, and power consumption compared to a reduced capability device for URLLC/eMBB. Some reduced capability devices may support a smaller bandwidth compared with a non-reduced capability device.

In some aspects, superlight reduced capability devices may have better coverage, for example, 20 dB coverage extension, from sidelink relay. In some aspects, low-power sidelink communications may be used for superlight reduced capability devices that are wearable devices or in-home network. Such sidelink communications for superlight reduced capability devices may be power-efficient. For example, sidelink relay may introduce power saving by avoiding a large number of repetitions (up to 2048 repetitions) for coverage extension. In another example, for wearable devices or in-home networks, short-distance sidelink may utilize a reduced power consumption compared to long-distance downlinks or sidelink. On the other hand, the sidelink communications for V2X may consume a large amount of power in sensing operations.

FIG. 4A is a diagram 400 illustrating an example of SL relay. As illustrated in FIG. 4A, a base station 402 may have a coverage area of 406, which may cover one or more relay supporting nodes (which may each be UEs) 404A, 404B, and 404C. Each of the nodes 404A, 404B, and 404C may respectively have a coverage area of 408A, 408B, and 408C. A UE may be able to connect (e.g., via SL) to one of the nodes 404A, 404B, or 404C to communicate with the base station 402. By utilizing the SL communications between a UE and one of the nodes 404A, 404B, or 404C, a coverage range of the base station 402 is extended from the area 406 to the area 406 plus the area 408A, the area 408B, and the area 408C.

FIG. 4B is a diagram 450 illustrating another example of SL relay. As illustrated in FIG. 4B, a base station 452 may have a coverage area of 456, which may cover one or more UEs including UE 454A and UE 454B. The UE 454A and the UE 454B may communicate (e.g., via SL) with one or more other devices in respective areas 458A and 458B, such as smart glasses, smart watches, heart rate monitors, or the like. The UE 454A and the UE 454B may relay communication from the one or more other devices to the base station 452. Because short distance SL communication between the UE 454A and the UE 454B and the one or more other devices and the communication between the UE 454A and the UE 454B with the base station 452 may consume less power than direct communication between the one or more other devices, power saving via sidelink communication relay may be enabled.

In IIoT, sidelink connectivity such as D2D interfaces (e.g., PC5, otherwise referred as sidelink at the physical layer) may be used to connect various devices such as PLC and S/A. Sidelink usage may provide a number of potential advantages, such as high capacity, low latency, and/or battery savings. FIG. 4C is a diagram 470 illustrating example traffic between PLC, base station, and other devices. As one example, a base station 472, PLCs 474a and 474b, and S/As 476a, 476b, 476c, and 476d are provided. An initial data transmission between the PLC 474a and the S/A 476a may be on a direct path via a sidelink interface between the PLC 474a and the S/A 476a. A retransmission between the PLC 474a and the S/A 476a may be based on a two-hop path by first transmitting to the base station 472, then the base station 472 may relay the transmission to the PLC 474a or the S/A 476a. In some aspects, a proactive base station fallback performed by a PLC or a S/A may include that the initial data transmission between the PLC (e.g., PLC 474a) and the S/A (e.g., S/A 476a) may be on reserved resources so that the base station may also decode the transmission. The base station (e.g., base station 472) may receive an acknowledgment (ACK) or a negative-acknowledgment (NACK) from a recipient, such as the S/A 476a. If a NACK is received, the base station 472 may transmit data in the data transmission between the PLC and the S/A to the S/A 476a. Under reactive base station fallback, in some aspects, after a transmission failure between the PLC 474a and the S/A 476a, the PLC 474a or the S/A 476a may perform the retransmission by transmitting to the base station 472 so that the base station 472 may relay the data to the PLC 474a or the S/A 476a.

Similarly, an initial data transmission between the PLC 474b and the S/A 476c may be on a sidelink interface between the PLC 474a and the S/A 476b. A retransmission between the PLC 474b and the S/A 476c may be based on first transmitting to the base station 472, then the base station 472 may relay the transmission to the PLC 474*a* or the S/A 476*a*. In some aspects, the retransmission may be performed because the initial transmission is blocked. Some aspects provided herein may provide the advantage of potentially high capacity, low latency, and/or battery savings because most communications between the PLCs and the S/As may be on a direct path via sidelink. The base station, which may be mounted on a ceiling and provide better coverage and may have an elevated transmission/reception point, may coordinate retransmissions to the PLCs or S/As to provide better reliability. Both mode 1 or mode 2 communications may be used for the sidelink communications.

In some aspects, under mode 1, the base station may configure sidelink configured grant (SL-CG) transmission/reception (Tx/Rx) at PLCs or S/As. The SL-CG may be configured without sidelink control information (SCI) to reduce overhead. In some aspects, the base station may also configure ACK/NACK resources for direct feedback on a first Tx from SL-Rx. In some aspects, the base station may also transmit retransmission (re-Tx) DCI to both SL-Tx and SL-Rx channel state information (CSI). For example, the base station may configure semi-periodic SL CSI-reference signal (RS), semi-periodic SL CSI reporting, and update SL-CG resource allocation based on updated CSI reports.

Under mode 2, in some aspects, the PLC configuration may be based on a rack system with different sub-systems such as power supply unit (PSU), central processing unit (CPU), interface module, communication processor, or the like.

In some aspects, under mode 1, the base station may configure sidelink configured grant (SL-CG) transmission/reception (Tx/Rx) at PLCs or S/As. The SL-CG may be configured without sidelink control information (SCI) to reduce overhead. In some aspects, the base station may also configure ACK/NACK resources for direct feedback on a first Tx from SL-Rx. In some aspects, the base station may also transmit retransmission (re-Tx) DCI to both SL-Tx and SL-Rx channel state information (CSI). For example, the base station may configure semi-periodic SL CSI-reference signal (RS), semi-periodic SL CSI reporting, and update SL-CG resource allocation based on updated CSI reports.

Under mode 2, in some aspects, the PLC configuration may be based on a rack system with different sub-systems such as power supply unit (PSU), central processing unit (CPU), interface module, communication processor, or the like.

SL communications may take place in a resource pool. A UE may be configured by higher layers with one or more sidelink resource pools. A sidelink resource pool can be for transmission of PSSCH, or for reception of PSSCH and the sidelink resource pool may be associated with (e.g., configured for) resource allocation mode 1 or resource allocation mode 2. As an example, for resource allocation mode 1, the SL resources may be either indicated by a network dynamically via DCI (such as DCI format 3_0 configured for sidelink scheduling) (which may be referred to as type 2) or configured without DCI (which may be referred to as type 2). In resource allocation mode 2, the UE may select resources for its SL transmission based on sensing and reservation without signalling from the network, as explained herein. In the frequency domain, a sidelink resource pool may include a quantity (e.g., indicated by parameter numSubchannel) of contiguous sub-channels. A sub-channel may include a quantity (e.g., indicated by parameter subchannelsize) of contiguous PRBs, where numSubchannel and subchannelsize are higher layer parameters.

FIG. 5A is a diagram 500 illustrating an example of SL mini-slot within a slot. One approach to reduce scheduling and turn-around time for SL communication is to introduce mini-slot scheduling as illustrated in FIG. 5A. As illustrated in FIG. 5A, a slot may be split into multiple mini-slots (which may be each of 4-symbol long). A mini-slot (which may also be referred to as "sub-slot) may be a set of symbols within one slot. In the example illustrated in FIG. 5A, a mini-slot may be self-scheduled and decodable by including both PSSCH and PSCCH in the set of symbols. In some aspects, as illustrated in FIG. 5A, a mini-slot may also include one or more symbols for automatic gain control (AGC). In some aspects, there may be gap symbol(s) introduced between each mini-slot of a slot. As the number of mini-slots within a slot increases (which enhances scheduling latency and may be suitable for small packets), more gap symbols may be included in the slot.

FIG. 5B is a diagram 550 illustrating a different example of SL sub-slot within a slot. As illustrated in FIG. 5B, a slot may be split into multiple sub-slots based on a pattern (e.g., length for each sub-slot may be defined by the pattern and may vary, quantity of sub-slots within the slot may also be defined by the pattern). In some aspects, PSCCH may be included at a beginning of the slot and may indicate transmission or reservation associated with each of the sub-slots in the same slot, or indicate transmission or reservation associated with sub-slots in subsequent slots. The sub-slots may not each include a separate PSCCH. In some aspects, AGC symbols may be not included for each of the sub-slots. In some aspects, as illustrated in FIG. 5A, a beginning of the slot may be used for AGC symbols for all of the sub-slots in the slot.

Figure 6:
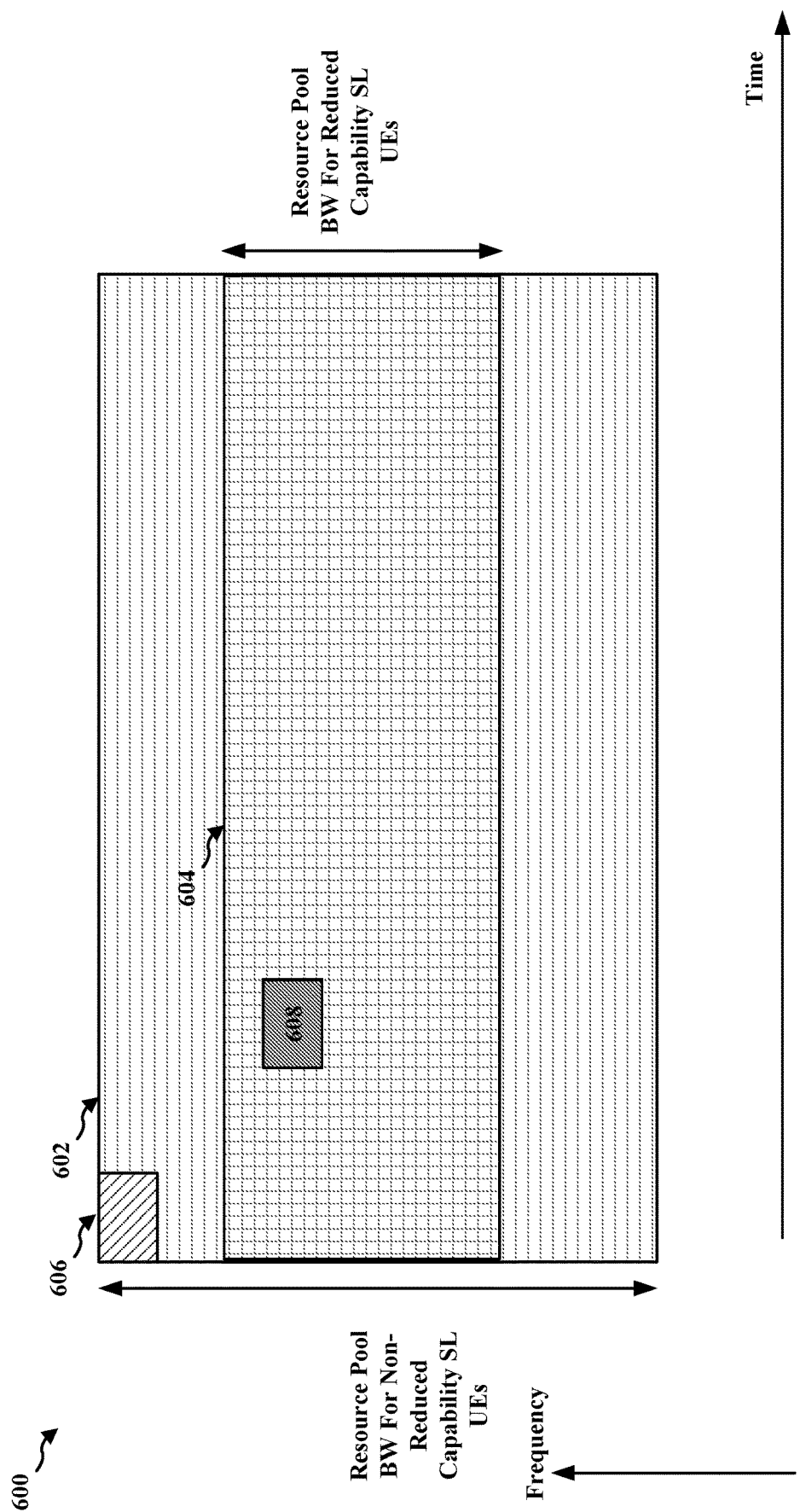
FIG. 6 is a diagram illustrating an example resource pool for SL transmissions.

A resource pool may be split into disjoint sets of resources. FIG. 6 is a diagram 600 illustrating an example resource pool for SL transmissions. As illustrated in FIG. 6, a resource pool 602 for non-reduced capability UEs may be overlapping with (i.e., encompassing) a resource pool 604 for reduced capability UEs. In some aspects, a reduced capability UE may operate in a fraction of the bandwidth of the resource pool 602 or the resource pool 604. When a non-reduced capability UE reserves a set of resources 606 in the portion of a resource pool, the signaling for the reservation 608 may occupy bandwidth in the resource pool 604 for reduced capability UEs. Because the reservation 608 may be signaled from a portion of the bandwidth that is not included in the operating bandwidth of the reduced capability UEs, the reduced capability UEs may not consider the reservation 608 when performing sensing and reservations. Therefore, collision (which may be power consuming for the reduced capability UEs) may occur. In addition, reservations made by reduced capability UEs may be detected by non-reduced capability UEs. By configuring the resource pool in accordance FIG. 6, multiplexing mechanisms for reduced capability UEs and non-reduced capability UEs to facilitate more efficient communications may be enabled. In some aspects, the multiplexing mechanisms may apply to all reduced capability UEs. In some aspects, the multiplexing mechanisms may apply to a subset of reduced capability UEs, such as a superlight UE.

Within a segmented resource pool, packets with different cast types might be transmitted. For example, a UE may transmit a packet based on unicast, groupcast or broadcast. For connection-less groupcast and for broadcast, the transmitted packets may be received by a set of UEs unknown to the transmitter because there may be no link setup between the UEs. As a result, the set of sub-bands for transmission or reception of such connection-less groupcast and broadcast cannot be modified over time. For such connection-less groupcast and broadcast, a resource pool may be partitioned into multiple sub-resource pool (sub-RPs) which may correspond with multiple sub-bands. Each of the multiple sub-RPs may be configured (e.g., without signaling) to be used for a particular cast type. For example, a first sub-set of sub-RPs in the resource pool may be configured to be used for broadcast or groupcast (e.g., connection-less groupcast but not managed groupcast). A second sub-set of sub-RPs in the resource pool may be configured to be used for unicast or managed groupcast (e.g., with link setup between UEs prior to connection). In some aspects, the first sub-set of sub-RPs may overlap with the second sub-set of sub-RPs and some particular sub-RPs may be used for various different types of cast type. For broadcast and groupcast, the selection of sub-RPs may be based on an application or service type associated with the broadcast or the groupcast. In some aspects, each sub-RP may be configured for one or more particular modes of operation (e.g., different mode 2 resource allocation such as full sensing based, partial sensing based, random selection based, or the like). By configuring each sub-RP with one or more particular modes of resource allocation, multiplexing of transmissions from UEs with different particular modes of operation may be improved. For example, a full sensing based UE may operate over a set of sub-RPs that is not configured for random selection UEs to reduce potential impact on the operations of the random selection UEs. In another example, a high priority packet may be transmitted over a set of sub-RPs configured for full sensing UEs to reduce potential impact from transmission of other UEs because full sensing UEs may sense the transmission and avoid collision.

As used herein, the term "repetition configuration" may refer to information related to receiving multiple instances of sidelink information. Repetition configuration may include a repetition indication, which may be indicative of the fact that multiple instances of sidelink information may be transmitted in different PSSCH transmissions. Repetition configuration may also include information indicative of a frequency hopping pattern. As used herein, the term "sidelink information" may refer to information transmitted in a PSSCH transmission from one UE to another. A first instance of sidelink information may be transmitted in a first PSSCH transmission and a second instance of the sidelink information (e.g., which may be a repetition) may be transmitted in a second PSSCH transmission. As used herein, the term "frequency hopping" may refer to changing frequency and associated frequency resource pool (e.g., sub-RP) between two data transmissions. As an example, intra-slot frequency hopping may occur when there is a first transmission on a first mini-slot of the slot based on a first frequency resource pool (e.g., sub-RP) and a second transmission on a second mini-slot of the same slot based on a second frequency resource pool (e.g., sub-RP), where the first frequency resource pool differs from the second frequency resource pool. As another example, inter-slot frequency hopping may occur when there is a first transmission on a first slot based on a first frequency resource pool (e.g., sub-RP) and a second transmission on a second slot based on a second frequency resource pool (e.g., sub-RP), where the first frequency resource pool differs from the second frequency resource pool. As used herein, the term "frequency hopping pattern" may be used to refer to information regarding frequency differences between a first transmission and a second transmission. For example, a frequency hopping pattern may include information indicative of a first frequency resource pool (e.g., sub-RP) for transmitting the first transmission and a second frequency resource pool (e.g., sub-RP) for transmitting the second transmission. A frequency resource pool or sub-RP may be associated with at least one frequency band. In another example, the frequency hopping pattern may be indicative of that the first transmission and the second transmission may be transmitted based on different frequencies. As used herein, the term "switching time gap" may refer to a time gap between two transmissions on different frequencies to allow a wireless device to switch the receive frequency.

Figure 7:
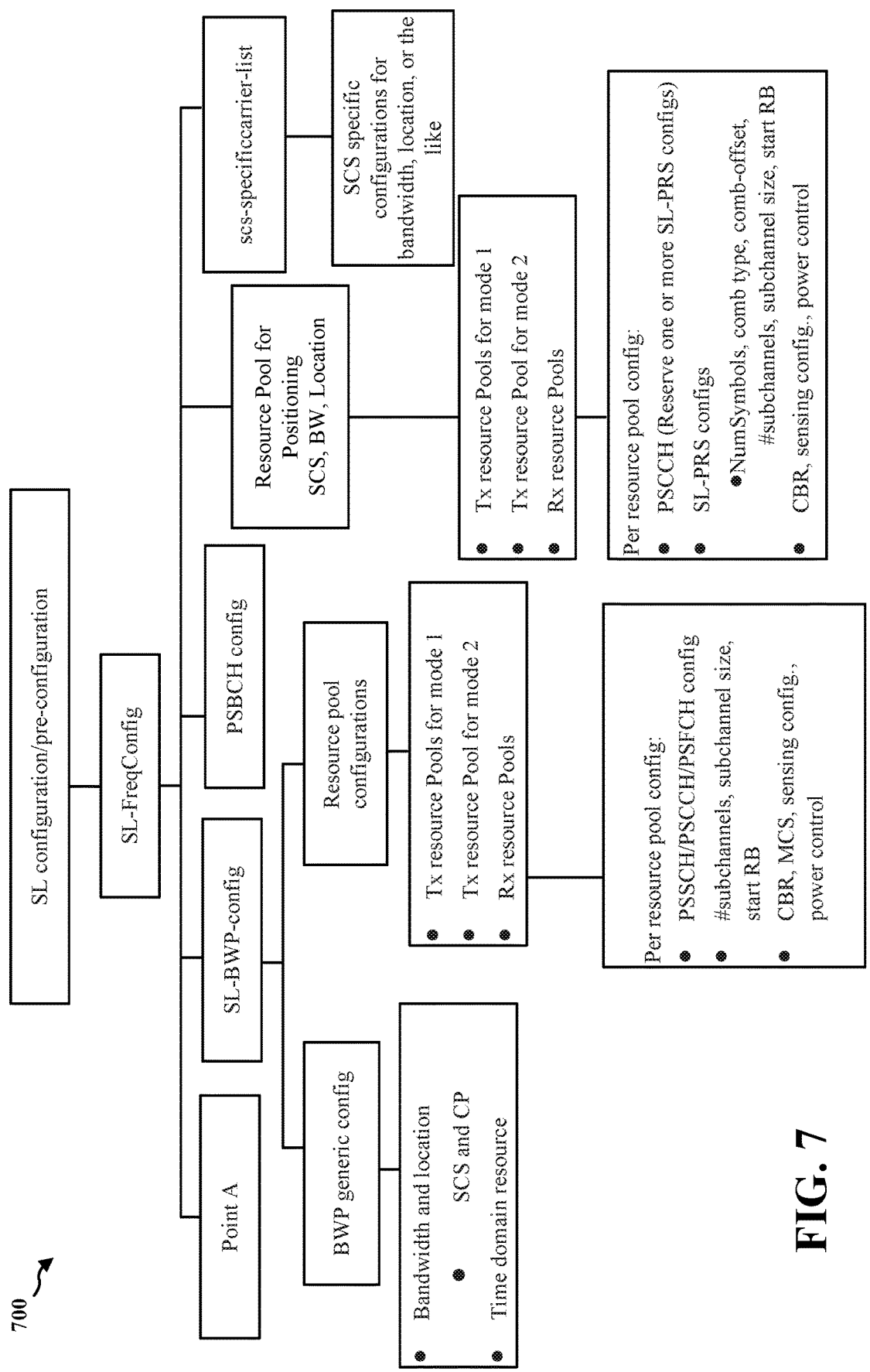
FIG. 7 is a diagram illustrating an example of SL configuration.

FIG. 7 is a diagram 700 illustrating an example of SL configuration. As illustrated in FIG. 7, in some wireless communication systems, a sidelink communication configuration (such as a sidelink positioning configuration, a sidelink data configuration, or a configuration used jointly for data and positioning) may include a SL frequency configuration and may be associated with a Point A (which may be a common reference point for resource block grids and may be represented by a frequency offset between Point A and a lowest subcarrier of the lowest resource block of the SS/PBCH block used by the UE for initial cell selection or an absolute frequency), a SL bandwidth part (BWP) configuration, a PSBCH configuration, a resource pool for positioning, SCS, BW, location, or the like, or a SCS carrier list. The SCS carrier list may be associated with SCS specific configurations for bandwidth, location, or the like. In some aspects, The SL BWP configuration may be associated with Tx resource pools for mode 1, Tx resource pools for mode 2, and Rx resource pools. In some aspects, per resource pool configurations may be provided. The per resource pool configurations may include PSSCH/PSCCH/PSFCH configurations, subchannel number, size, or starting RB, and channel busy ratio (CBR), modulation and coding scheme (MCS), sensing configuration, or power control configurations. In some aspects, the resource pool for positioning. SCS, BW, location, or the like may be associated with Tx resource pools for mode 1, Tx resource pools for mode 2, and Rx resource pools. In some aspects, per resource pool configurations may be provided. The per resource pool configurations may include PSCCH or SL-PRS configurations (e.g., including number of symbols, comb type, comb offset, number of subchannels, subchannel size, subchannel starting RB, or the like), CBR, MCS, sensing configuration, or power control configurations. As illustrated in FIG. 7, one BWP may include multiple transmission and reception resource pools, and PHY layer channels may be configured per resource pool.

For some sidelink communications, such as sidelink communications based on mini-slots, a UE might use frequency hopping to transmit data across mini-slots or slots. Aspects provided herein may improve transmissions with frequency hopping and enable more efficient processing of transmissions with frequency hopping. In some aspects, intra-slot frequency hopping may be allowed for transmissions based on mode 1 resource allocation and transmissions based on mode 2 resource allocation. In some aspects, intra-slot frequency hopping may be allowed based on signaling from the network or based on signaling between the UEs.

Figure 8:
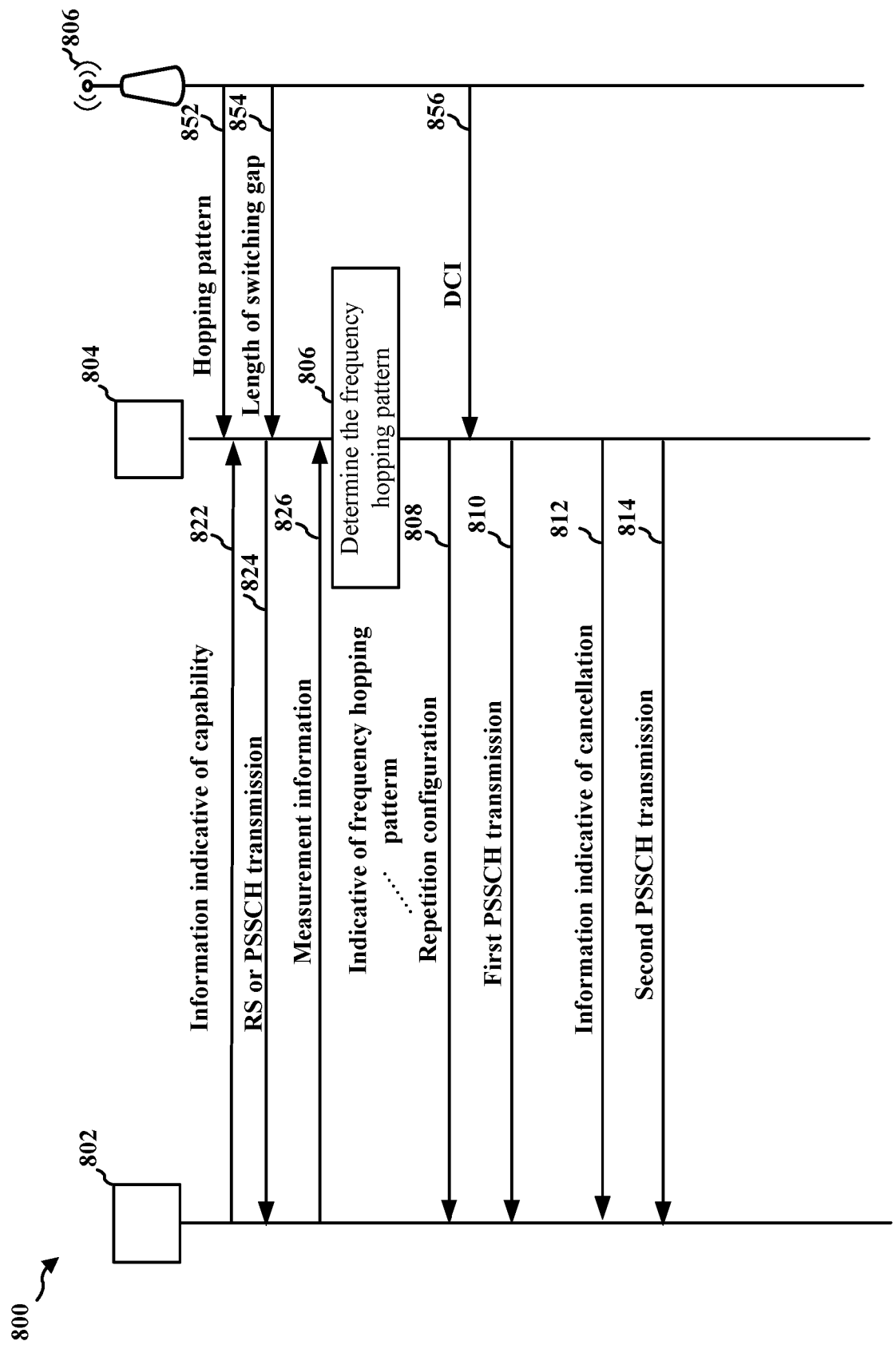
FIG. 8 is a diagram illustrating example communications between a first UE and a second UE.

FIG. 8 is a diagram 800 illustrating example communications between a first UE 802 and a second UE 804. To facilitate intra-slot frequency hopping of SL communications between the first UE 802 and the second UE 804, a repetition configuration 808 may be transmitted from the second UE 804 to the first UE 802. In some aspects, the first UE 802 may be a reduced capability UE. In some aspects, the first UE 802 may be a non-reduced capability UE. In some aspects, the first UE 802 may be an energy harvesting UE or a non-energy harvesting UE. In some aspects, the repetition configuration 808 may include a frequency hopping pattern or a repetition indication associated with a first PSSCH transmission 810 and a second PSSCH transmission 814 from the second UE 804 to the first UE 802. In some aspects, the first PSSCH transmission 810 may be based on a first frequency resource pool (e.g., sub-RP) and the second PSSCH transmission 814 may be based on a second frequency resource pool (e.g., sub-RP). In some aspects, the repetition configuration 808 may be provided to the first UE 802 to enable the first UE 802 to process (e.g., decode) the first PSSCH transmission 810 and the second PSSCH transmission 814. By knowing the frequency hopping pattern configured by the repetition configuration 808, the UE 802 may be able to receive and process the first PSSCH transmission 810 and the second PSSCH transmission 814. For example, after determining the frequency resources used for the first PSSCH transmission 810 and the frequency hopping pattern, the UE 802 may be able to determine the determining the frequency resources used for the second PSSCH transmission 814 and receive the second PSSCH transmission 814 accordingly.

In some aspects, to transmit the first PSSCH transmission 810 and the second PSSCH transmission 814, the UE 804 may receive DCI 856 indicating configured grant (CG) or dynamic grant (DG) for the first PSSCH transmission 810 and the second PSSCH transmission 814 from the network entity 806. In some aspects, the UE 804 may determine the time and frequency resources for the first PSSCH transmission 810 and the second PSSCH transmission 814 without network signaling, such as based on full sensing, partial sensing, or the like.

In some aspects, the repetition configuration 808 may be transmitted before a PSCCH (e.g., first stage sidelink control information (SCI)) associated with the first PSSCH transmission 810. An SCI may include a first stage SCI and a second stage SCI. The first stage SCI may be carried on PSCCH and contains information to enable sensing operations, as well as information about the resource allocation of the PSSCH. The second stage SCI may be transmitted via PSSCH. The second stage SCI may carry information to identify and decode the associated sidelink shared channel (SL-SCH), as well as control for HARQ procedures, and triggers for CSI feedback, or the like. The SL-SCH may carry the TB of data for transmission over SL. The resources in which PSSCH is transmitted may be scheduled or configured by a base station or determined through a sensing procedure conducted autonomously by the transmitting UE. The second stage SCI may be mapped to contiguous RBs in PSSCH starting from the first symbol associated with PSSCH DM-RS. A format of the second stage SCI may be indicated in the first stage SCI. The first stage SCI may be referred to as SCI-1, and may be transmitted in PSCCH. A number of resource elements (REs) may be derived based on the first stage SCI. A starting location of the second stage SCI may be defined and known to a UE. In some aspects, a UE may not blindly decode second stage SCI. A second stage SCI format may include one or more of a HARQ process identifier (ID), a new data indicator (NDI), a source ID, a destination ID, a CSI report trigger, or the like. A second stage SCI format associated with a groupcast may also include a zone ID indicating a location of a transmitter and a communication range for sending feedback. In some aspects, the repetition configuration 808 may be transmitted with the PSCCH (e.g., a first stage SCI) associated with the first PSSCH transmission 810.

In some aspects, the repetition configuration 808 may be indicated based on an RRC signaling, a MAC control element (MAC-CE), or based on SCI. In some aspects, the first PSSCH transmission 810 and the second PSSCH transmission 814 may be associated with a same time domain resource allocation (RA) associated with different slots or mini-slots and may be based on different sub-RPs. For example, with the same time domain resource allocation, the time difference between the first PSSCH transmission 810 and a beginning of the slot or mini-slot associated with the first PSSCH transmission 810 may be the same as a time difference between the second PSSCH transmission 814 and a beginning of the slot or mini-slot associated with the second PSSCH transmission 814. In some aspects, the first PSSCH transmission 810 and the second PSSCH transmission 814 may be associated with a same relative RB location (e.g., compared with a boundary of the respective sub-RP).

In some aspects, if the UE 802 and the UE 804 are operating based on mode 1, the sub-RPs associated with the frequency hopping pattern indicated by the repetition configuration 808 may be transmitted from the network entity 806 to the UE 804 in frequency hopping pattern 852. In some aspects, the frequency hopping pattern 852 may be transmitted based on downlink control information (DCI), MAC-CE, or RRC signaling. In some aspects, if the UE 802 and the UE 804 are operating based on mode 1, the sub-RPs associated with the frequency hopping pattern indicated by the repetition configuration 808 may be determined by the UE 804 at 806 without signaling from the network entity 806. For example, the UE 804 may determine the frequency hopping pattern and the associated sub-RPs based on configured rules (e.g., using highest and lowest indices of sub-RPs which may be the furthest apart, using sub-RPs that are close to each other, or any other configured rules).

In some aspects, if the UE 802 and the UE 804 are operating based on mode 1, the sub-RPs associated with the frequency hopping pattern indicated by the repetition configuration 808 may be determined by the UE 804 at 806 and then indicated to the UE 802. For example, the UE 804 may determine the frequency hopping pattern and the associated sub-RPs based on configured rules (e.g., using highest and lowest indices of sub-RPs which may be the furthest apart, using sub-RPs that are close to each other, or any other configured rules).

In some aspects, the network entity 806 may transmit one or more allowed frequency hopping patterns (e.g., frequency hopping pattern 852) (and associated sub-RPs) and the UE 804 may determine a frequency hopping pattern (and associated sub-RPs) at 806.

In some aspects, to determine the frequency hopping pattern and associated sub-RPs at 806, the UE 804 may receive information or feedback from the UE 802. For example, the UE 804 may receive measurement information 826 which may be SL RS measurements or CSI measurements based on PSSCH, which may be based on SL RS or PSSCH transmission 824. In another example, to determine the frequency hopping pattern and associated sub-RPs at 806, the UE 804 may receive information 822 indicative of a capability of the UE 802. For example, the UE 802 may indicate that the UE 802 is capable of switching frequency based on a maximum supported frequency difference, and the UE 802 may not determine the frequency hopping pattern such that the sub-RPs used are of a difference larger than the maximum supported frequency difference. In some aspects, determine the frequency hopping pattern and associated sub-RPs at 806 may be based on one or more IDs (indices) associated with the sub-RPs and one or more IDs associated with time domain resources for the PSSCH transmission. For example, the UE 802 may determine to use a sub-RP with lowest index for PSSCH transmissions in odd-numbered slots or mini-slots and determine to use a sub-RP with highest index for PSSCH transmissions in even-numbered slots or mini-slots.

In some aspects, the UE 804 may cancel the second PSSCH transmission 814. For example, the UE 804 may cancel the second PSSCH transmission 814 by transmitting information indicative of the cancellation 812 to the UE 802. A cancelled transmission may be transmitted (e.g., with or without sidelink information) for energy harvesting or not transmitted. The UE 802 may accordingly skip monitoring of the second PSSCH transmission 814. In some aspects, the UE 804 may cancel the second PSSCH transmission 814 because the UE 802 may be unable to receive the second PSSCH transmission 814 due to another transmission (which may be sensed by the UE 804) or due to a lack of power. If the UE 802 is lacking power, the information indicative of the cancellation 812 may also include an energy harvesting indication to allow the UE 802 to harvest energy from a signal for the second PSSCH transmission 814.

Figure 9:
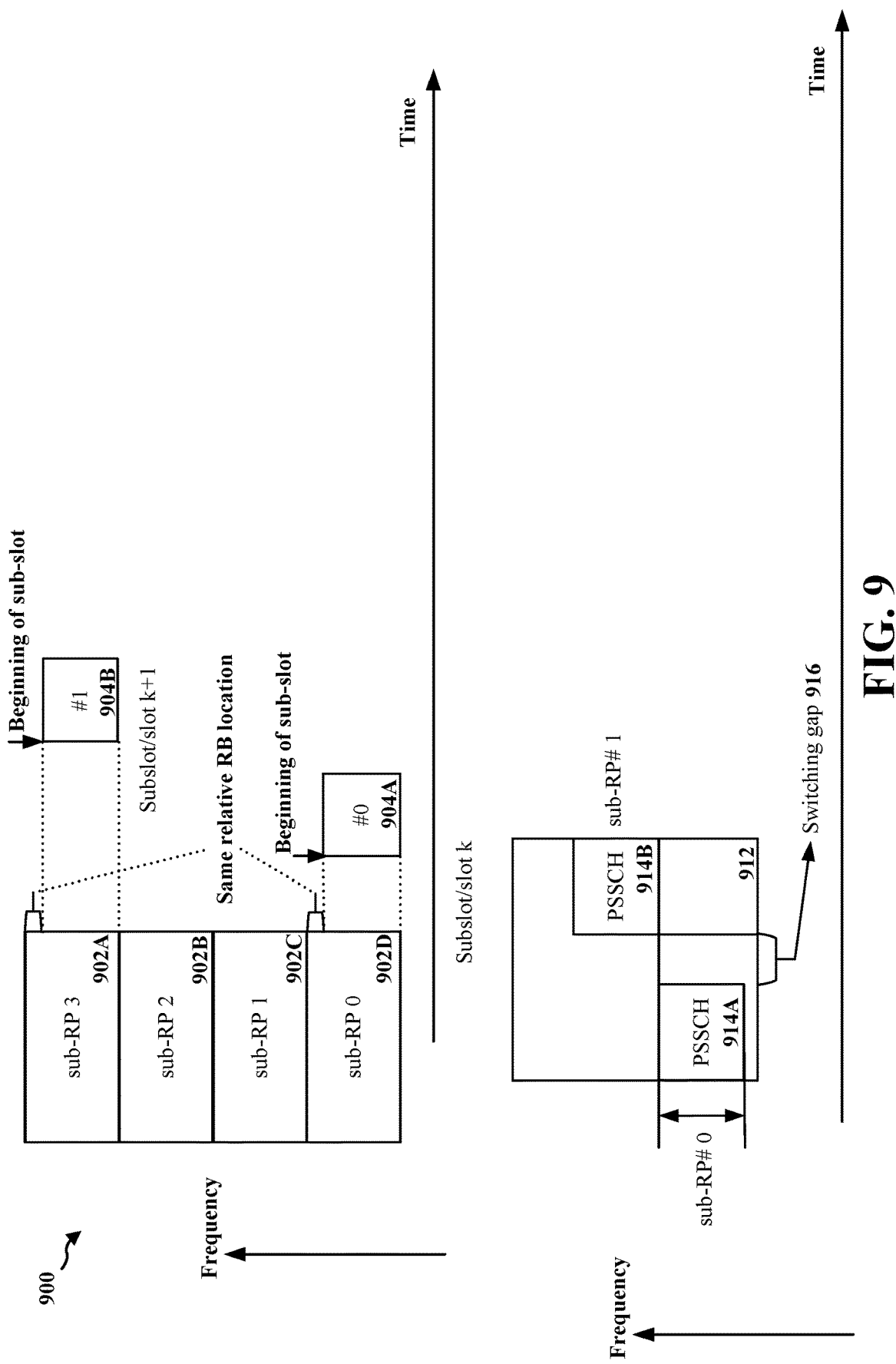
FIG. 9 is a diagram illustrating an example of intra-slot frequency hopping for PSSCH.

Referring now to FIG. 9. FIG. 9 is a diagram 900 illustrating an example of intra-slot frequency hopping for PSSCH. As illustrated in FIG. 9, there may be a total of four sub-RPs including sub-RP 3 902A, sub-RP 2 902B, sub-RP 1 902C, and sub-RP 0 902D. The first PSSCH transmission 810 may be based on the sub-RP 0 902D in a first sub-slot or first slot 904A of index K. The second PSSCH transmission 814 may be based on the sub-RP 3 902A in a second sub-slot or second slot 904B of index K+1. As illustrated in FIG. 9, the relative RB location (in relation to the sub-RP 0 902D) of the PSSCH transmission in the first sub-slot or first slot 904A may be the same as the relative RB location (in relation to the sub-RP 3 902A) of the PSSCH transmission in the second sub-slot or second slot 904B. As illustrated in FIG. 9, the time domain allocation of PSSCH transmission in the first sub-slot or first slot 904A may be the same as the PSSCH transmission in the second sub-slot or second slot 904B (both at the beginning of the mini-slot).

Figure 10:
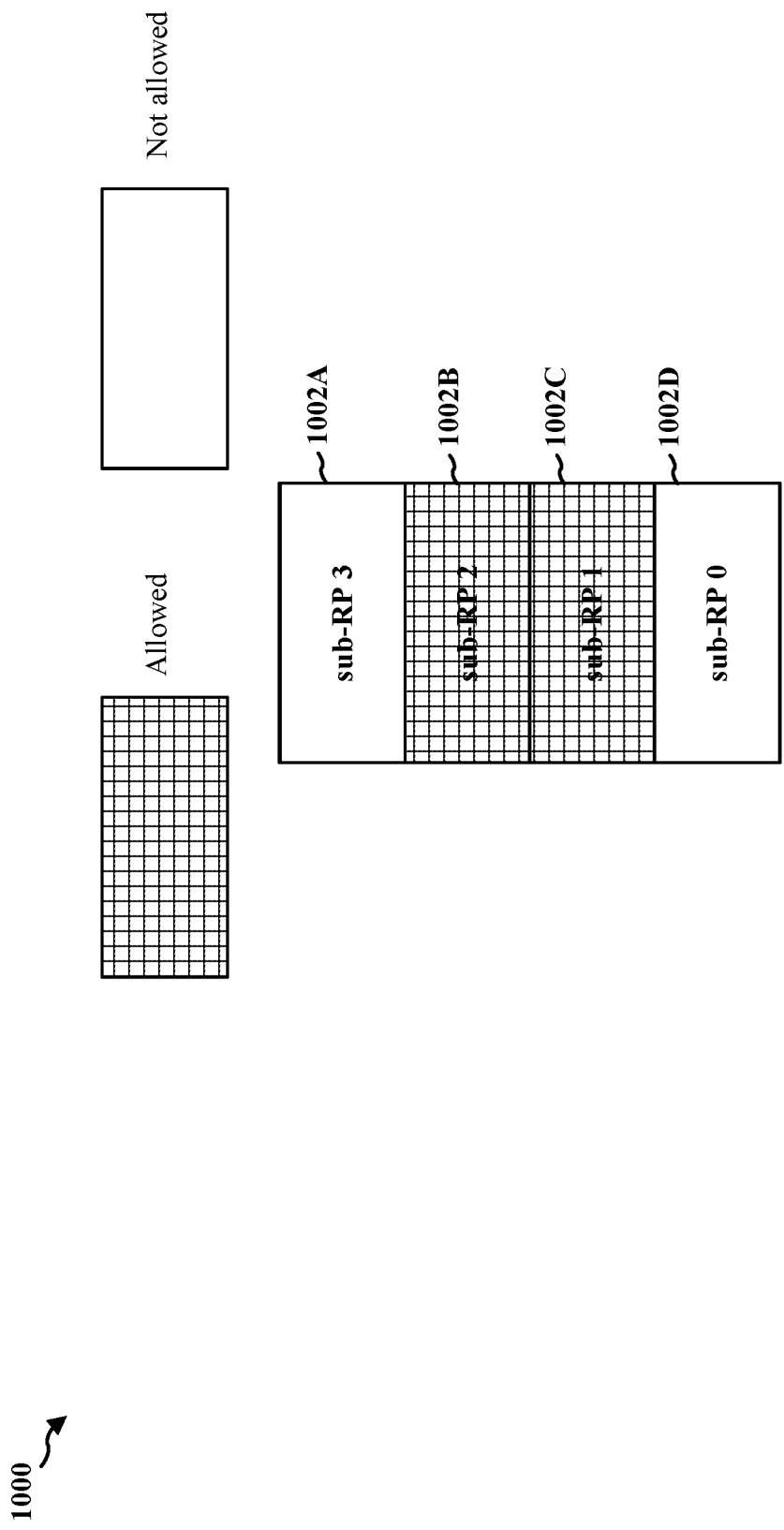
FIG. 10 is a diagram illustrating an example of an allowed frequency hopping pattern.

In some aspects, the repetition configuration may include a frequency hopping pattern that indicates the allowed frequency differences between the first PSSCH transmission and the second PSSCH transmission. For example, the frequency hopping pattern may indicate an allowed sub-RP index difference or corresponding allowed frequency difference between the sub-RPs used for the first PSSCH transmission and the second PSSCH transmission. For example, the allowed sub-RP index difference or corresponding allowed frequency difference may define a maximum allowed difference in one direction (e.g., positive) and another maximum allowed difference in another direction (e.g., negative). FIG. 10 is a diagram 1000 illustrating an example of an allowed frequency hopping pattern. As illustrated in FIG. 10, if the first PSSCH transmission is transmitted on sub-RP 2 1002B, the second PSSCH transmission may be allowed to be transmitted on sub-RP 3 1002C, while sub-RP 3 1002D and sub-RP 0 1002A may not be allowed. In the example illustrated in FIG. 10, the allowed sub-RP index difference in the positive direction may be 1 and the allowed sub-RP index difference in the negative direction may be 0. In some aspects, the allowed sub-RP index difference or corresponding allowed frequency difference between the sub-RPs used for the first PSSCH transmission and the second PSSCH transmission may be based on a capability of the receiving UE and selected by the transmitting UE. In some aspects, the allowed sub-RP index difference or corresponding allowed frequency difference between the sub-RPs used for the first PSSCH transmission and the second PSSCH transmission may be configured by the network.

Figures 11A, 11B:
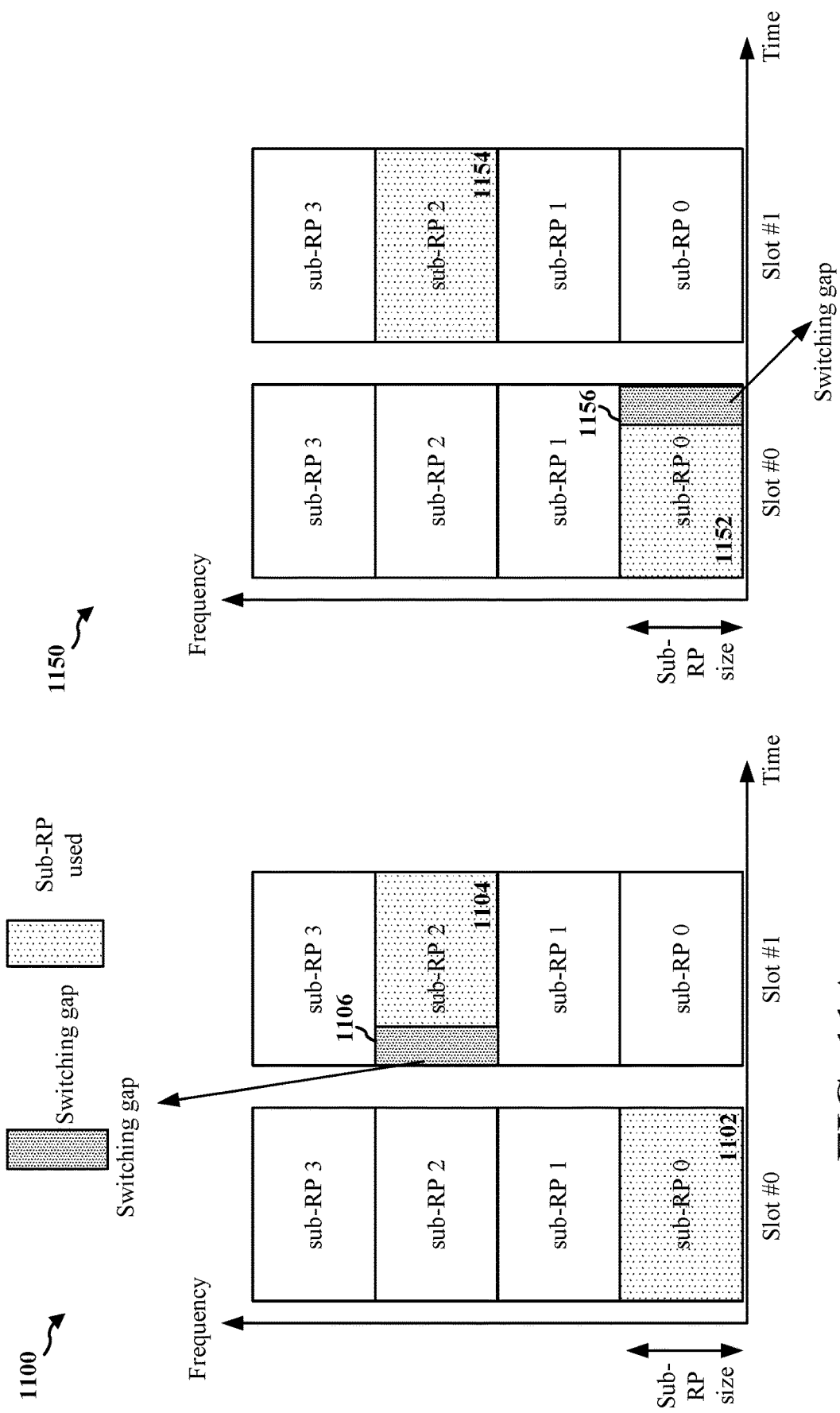
FIG. 11A is a diagram illustrating an example of a switching time gap.
FIG. 11B is a diagram illustrating another example of a switching time gap.

Referring back to FIG. 9, in some aspects, to facilitate frequency hopping across different sub-RPs, a switching time gap 916 may be introduced between a first PSSCH transmission 914A and a second PSSCH transmission 914B in a same slot 912. In some aspects, the switching time gap may be configured as one or more symbols at the beginning of the time domain allocation after hopping (e.g., right before the second PSSCH transmission). FIG. 11A is a diagram 1100 illustrating an example of a switching time gap. As illustrated in FIG. 11A, a first PSSCH transmission may be transmitted using sub-RP 0 1102 and a second PSSCH transmission may be transmitted using sub-RP 2 1104. A switching time gap 1106 may be introduced right before the second PSSCH transmission.

In some aspects, the switching time gap may be configured as one or more symbols at the end of the time domain allocation before hopping (e.g., right after the first PSSCH transmission). FIG. 11B is a diagram 1150 illustrating another example of a switching time gap. As illustrated in FIG. 11B, a first PSSCH transmission may be transmitted using sub-RP 0 1152 and a second PSSCH transmission may be transmitted using sub-RP 2 1154. A switching time gap 1156 may be introduced right after the first PSSCH transmission.

In some aspects, the switching time gap may be configured (e.g., by the network entity 806 based on switching gap length 854) based on RRC signaling, SCI or DCI, MAC-CE, configured using other layer 1 (L1) signaling, layer 2 (L2) signaling, or layer 3 (L3) signaling, configured during initial access, or configured without signaling. In some aspects, the switching time gap may be defined per resource pool, per sub-RP, per multiple sub-RPs, or the like. In some aspects, the switching time gap may be based on sub-RP size or RP size. In some aspects, if the switching time gap may overlap with one or more symbols in the PSSCH transmission, the one or more symbols in the PSSCH transmission may be punctured or rate-matched. In some aspects, the switching time gap may be based on RF tuning, a sub-RP associated with the first PSSCH transmission or a next sub-RP associated with the second PSSCH transmission, an energy state of the receiving UE, or the like. As used herein, the term "energy state" (which may also be referred to as "energy mode," "energy information," or "energy status") may refer to one or more of: an energy level profile representing available energy at a device's energy storage unit or battery over time based on current measurements and prediction over time (e.g., current available energy, predicted future available energy and associated predicted time instances or durations, or the like), an energy charging profile representing an energy charging rate or other energy charging related parameters related to the device's energy storage unit or battery (e.g., a current energy charging rate, predicted future energy charging rates and associated predicted time instances or durations, or the like), an energy discharging profile representing an energy discharging rate (e.g., a current energy discharging rate, predicted future energy discharging rates and associated predicted time instances or durations, or the like), or other energy discharging related parameters related to the device's energy storage unit or battery. For example, an energy charging profile may include a current measured charging rate, how long the current charging rate is predicted to last, a predicted charging rate for one or more future time instances or durations, or the like. As one example, the energy charging profile may include P1, P2, P3, P4, . . . , PN (each of which represent an energy charging rate and T1 (time instance or duration predicted for charging rate P1 to last), T2 (time instance or duration predicted for charging rate P2 to last), T3 (time instance or duration predicted for charging rate P3 to last), T4 (time instance or duration predicted for charging rate P4 to last), . . . , TN (time instance or duration predicted for charging rate PN to last). In some aspects, based on an agreement with two wireless devices (such as a UE and a gNB or between two UEs), a wireless device may decide based on the profiles (e.g., and the values in each profile including P1, P2, . . . , PN, the parameters, T1, T2, . . . , TN) for each profile of the energy charging profile, the energy discharging profile, or the energy level profile.

Figure 12:
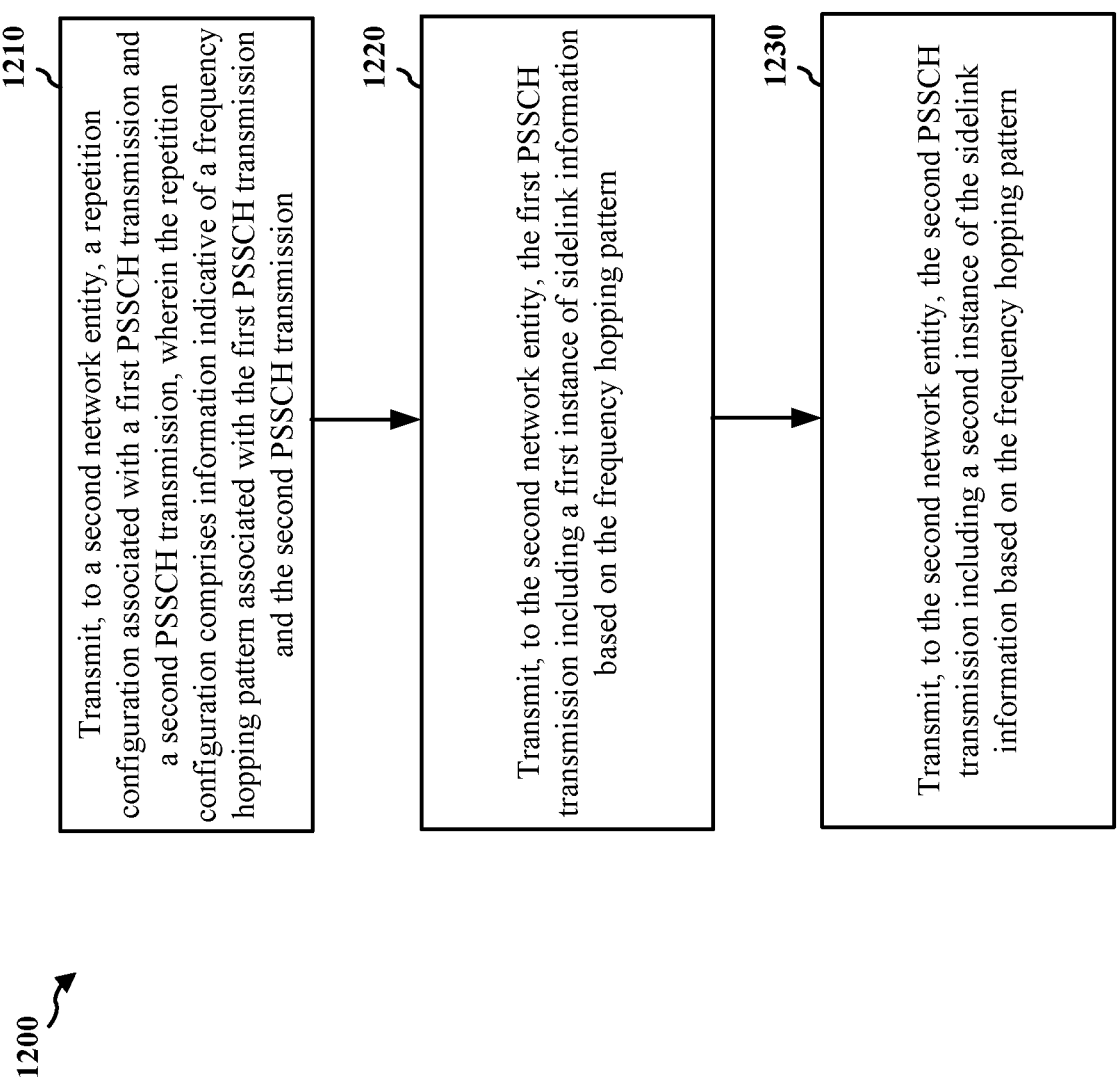
FIG. 12 is a flowchart of a method of wireless communication.

FIG. 12 is a flowchart 1200 of a method of wireless communication. The method may be performed by a first network entity, such as a UE, a PLC, or the like (e.g., the UE 104, the UE 804; the apparatus 1504).

At 1210, the first network entity may transmit, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. For example, the UE 804 may transmit, to a second network entity (e.g., the UE 802), a repetition configuration (e.g., 808) associated with a first PSSCH transmission (e.g., 810) and a second PSSCH transmission (e.g., 814), where the repetition configuration includes information indicative of a frequency hopping pattern associated with the first PSSCH transmission and the second PSSCH transmission. In some aspects, 1210 may be performed by repetition component 198.

At 1220, the first network entity may transmit, to the second network entity, the first PSSCH transmission including a first instance of sidelink information based on the frequency hopping pattern. For example, the UE 804 may transmit, to the second network entity (e.g., the UE 802), the first PSSCH transmission (e.g., 810) including a first instance of sidelink information based on the frequency hopping pattern (e.g., 808). In some aspects, 1220 may be performed by repetition component 198.

At 1230, the first network entity may transmit, to the second network entity, the second PSSCH transmission including a second instance of the sidelink information based on the frequency hopping pattern. For example, the UE 804 may transmit, to the second network entity (e.g., the UE 802), the second PSSCH transmission (e.g., 814) including a second instance of the sidelink information based on the frequency hopping pattern (e.g., 808). In some aspects, 1230 may be performed by repetition component 198.

Figure 13:
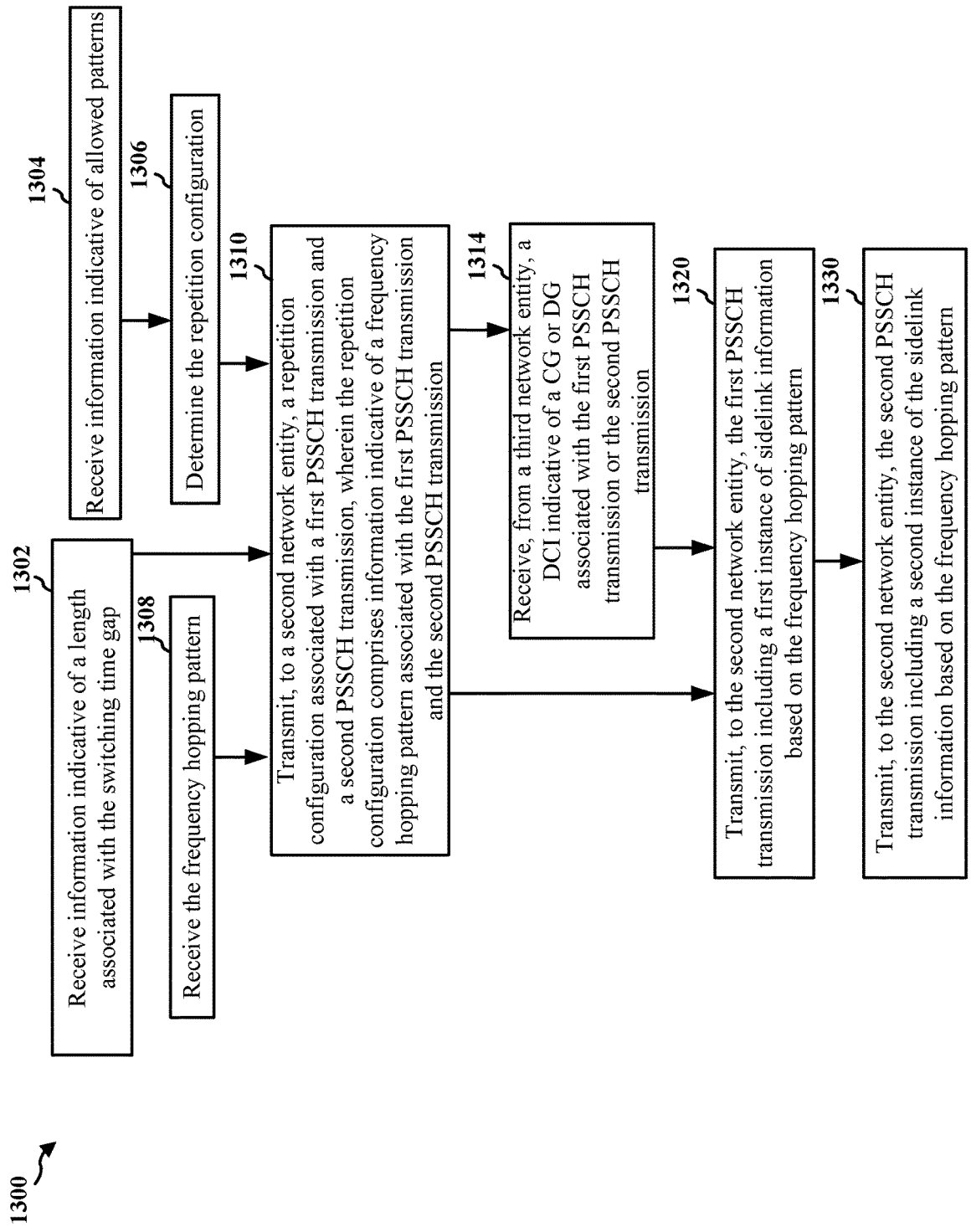
FIG. 13 is a flowchart of a method of wireless communication.

FIG. 13 is a flowchart 1300 of a method of wireless communication. The method may be performed by a first network entity, such as a UE, a PLC, or the like (e.g., the UE 104, the UE 804; the apparatus 1504).

At 1302, the first network entity may receive information indicative of a length associated with the switching time gap. For example, the UE 804 may receive information indicative of a length associated with the switching time gap (e.g., 854). In some aspects, 1302 may be performed by repetition component 198.

At 1304, the first network entity may receive, from a third network entity, information indicative of one or more allowed patterns. For example, the UE 804 may receive, from a third network entity, information indicative of one or more allowed patterns (e.g., 852). In some aspects, 1304 may be performed by repetition component 198.

At 1306, the first network entity may determine the frequency hopping pattern from one of the one or more allowed patterns. For example, the UE 804 may determine (e.g., at 806) the frequency hopping pattern from one of the one or more allowed patterns. In some aspects, 1306 may be performed by repetition component 198.

At 1308, the first network entity may receive, from a third network entity, the frequency hopping pattern. For example, the UE 804 may receive, from a third network entity (e.g., 806), the frequency hopping pattern (e.g., 852). In some aspects, 1308 may be performed by repetition component 198.

In some aspects, the first network entity may receive, from the second network entity, measurement information based on sidelink RSs or a third PSSCH transmission.

At 1310, the first network entity may transmit, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. For example, the UE 804 may transmit, to a second network entity (e.g., the UE 802), a repetition configuration (e.g., 808) associated with a first PSSCH transmission (e.g., 810) and a second PSSCH transmission (e.g., 814), where the repetition configuration includes information indicative of a frequency hopping pattern associated with the first PSSCH transmission and the second PSSCH transmission. In some aspects, 1310 may be performed by repetition component 198. In some aspects, to transmit the repetition configuration, the first network entity may transmit the repetition configuration before SCI associated with the first PSSCH transmission. In some aspects, to transmit the repetition configuration, the first network entity may transmit the repetition configuration with SCI associated with the first PSSCH transmission. In some aspects, the frequency hopping pattern is indicative of an allowed frequency hopping pattern associated with the first PSSCH transmission and the second PSSCH transmission. In some aspects, the allowed frequency hopping pattern is based on a bandwidth switch capability associated with the second network entity.

At 1314, the first network entity may receive DCI indicative of a CG or a DG associated with the first PSSCH transmission or the second PSSCH transmission. For example, the UE 804 may receive DCI 856 indicative of a CG or a DG associated with the first PSSCH transmission or the second PSSCH transmission. In some aspects, 1314 may be performed by repetition component 198.

At 1320, the first network entity may transmit, to the second network entity, the first PSSCH transmission including a first instance of sidelink information based on the frequency hopping pattern. For example, the UE 804 may transmit, to the second network entity (e.g., the UE 802), the first PSSCH transmission (e.g., 810) including a first instance of sidelink information based on the frequency hopping pattern (e.g., 808). In some aspects, 1320 may be performed by repetition component 198. In some aspects, to transmit the first PSSCH transmission, the first network entity may transmit the first PSSCH transmission in a first mini-slot or a first slot. In some aspects, to transmit the first PSSCH transmission, the first network entity may transmit the first PSSCH transmission in a first sub-RP of a sidelink RP. In some aspects, to transmit the first PSSCH transmission, the first network entity may transmit the first PSSCH transmission in a first sub-RP of a sidelink RP. In some aspects, to transmit the first PSSCH transmission, the first network entity may transmit the first PSSCH transmission in a relative RB location in the first RP. In some aspects, to transmit the first PSSCH transmission, the first network entity may transmit the first PSSCH transmission based on a time domain RA.

At 1330, the first network entity may transmit, to the second network entity, the second PSSCH transmission including a second instance of the sidelink information based on the frequency hopping pattern. For example, the UE 804 may transmit, to the second network entity (e.g., the UE 802), the second PSSCH transmission (e.g., 814) including a second instance of the sidelink information based on the frequency hopping pattern (e.g., 808). In some aspects, 1330 may be performed by repetition component 198. In some aspects, to transmit the second PSSCH transmission, the first network entity may transmit the second PSSCH transmission in a second mini-slot or a second slot. In some aspects, an end of the first mini-slot or the first slot or a beginning of the second mini-slot or the second slot is configured to include a switching time gap. In some aspects, to transmit the second PSSCH transmission, the first network entity may transmit the second PSSCH transmission in a second sub-RP of the sidelink RP. In some aspects, a length associated with the switching time gap is based on a first size or a first identifier associated with the first sub-RP, a second size or a second identifier associated with the second sub-RP, or a third identifier associated with the RP. In some aspects, the first network entity may puncture or rate-match a portion of the first instance of the sidelink information or the second instance of the sidelink information based on the switching time gap being configured to overlap with the portion. In some aspects, a length associated with the switching time gap is based on an energy state associated with the second network entity. In some aspects, to transmit the second PSSCH transmission, the first network entity may transmit the second PSSCH transmission in a second sub-RP of the sidelink RP. In some aspects, to transmit the second PSSCH transmission, the first network entity may transmit the second PSSCH transmission in the relative RB location in the second sub-RP. In some aspects, to transmit the second PSSCH transmission, the first network entity may transmit the second PSSCH transmission based on the time domain RA. In some aspects, the first network entity may receive, from a third network entity (e.g., 806), information (e.g., 852) indicative of the first sub-RP and the second sub-RP. In some aspects, the first network entity may transmit, to the second network entity, information indicative of the first sub-RP and the second sub-RP (e.g., in 808). In some aspects, the first network entity may determine the first sub-RP based on a first index associated with the first sub-RP and determine the second sub-RP based on a second index associated with the second sub-RP. In some aspects, a first one of the first index or the second index is a highest index associated with the sidelink RP, and where a second one of the first index or the second index is a lowest index associated with the sidelink RP. In some aspects, to determine the first sub-RP and the second sub-RP, the first network entity may determine the first sub-RP based on a first time resource identifier associated with the first PSSCH transmission and determine the second sub-RP based on a second time resource identifier associated with the second PSSCH transmission.

In some aspects, the first network entity may transmit, to the second network entity (e.g., the UE 802), information (e.g., 812) indicative of a cancellation of the second instance of the sidelink information. In some aspects, the first network entity may receive, from the second network entity, information indicative of energy harvesting. In some aspects, the first network entity may transmit, to the second network entity based on the information indicative of energy harvesting, the second PSSCH transmission.

Figure 14:
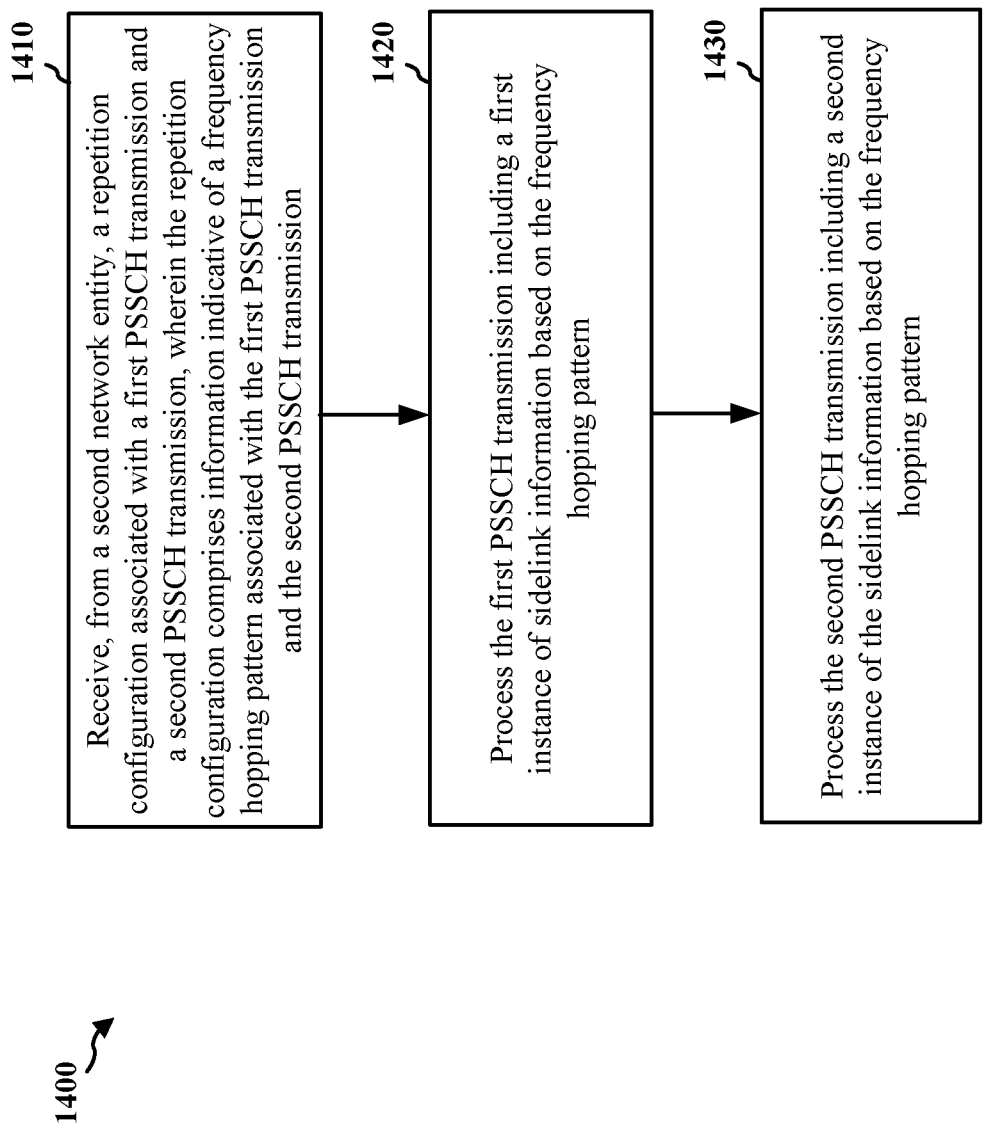
FIG. 14 is a flowchart of a method of wireless communication.

FIG. 14 is a flowchart 1400 of a method of wireless communication. The method may be performed by a first network entity, such as a UE, a PLC, or the like (e.g., the UE 104, the UE 802; the apparatus 1504).

At 1410, the first network entity may receive, from a second network entity, a repetition configuration associated with a first PSSCH transmission and a second PSSCH transmission, where the repetition configuration includes information indicative of a frequency hopping pattern associated with the first PSSCH transmission and the second PSSCH transmission. For example, the UE 802 may receive, from a second network entity (e.g., the UE 804), a repetition configuration (e.g., 808) associated with a first PSSCH transmission (e.g., 810) and a second PSSCH transmission (e.g., 814), where the repetition configuration includes information indicative of a frequency hopping pattern associated with the first PSSCH transmission and the second PSSCH transmission. In some aspects, 1410 may be performed by repetition component 199. In some aspects, the second network entity may be a UE or a PLC.

At 1420, the first network entity may process the first PSSCH transmission including a first instance of sidelink information based on the frequency hopping pattern. For example, the UE 802 may process the first PSSCH transmission (e.g., 810) including a first instance of sidelink information based on the frequency hopping pattern (e.g., 808). In some aspects, 1420 may be performed by repetition component 199.

At 1430, the first network entity may process the second PSSCH transmission including a second instance of the sidelink information based on the frequency hopping pattern. For example, the UE 802 may process the second PSSCH transmission (e.g., 814) including a second instance of the sidelink information based on the frequency hopping pattern (e.g., 808). In some aspects, 1430 may be performed by repetition component 199.

Figure 15:
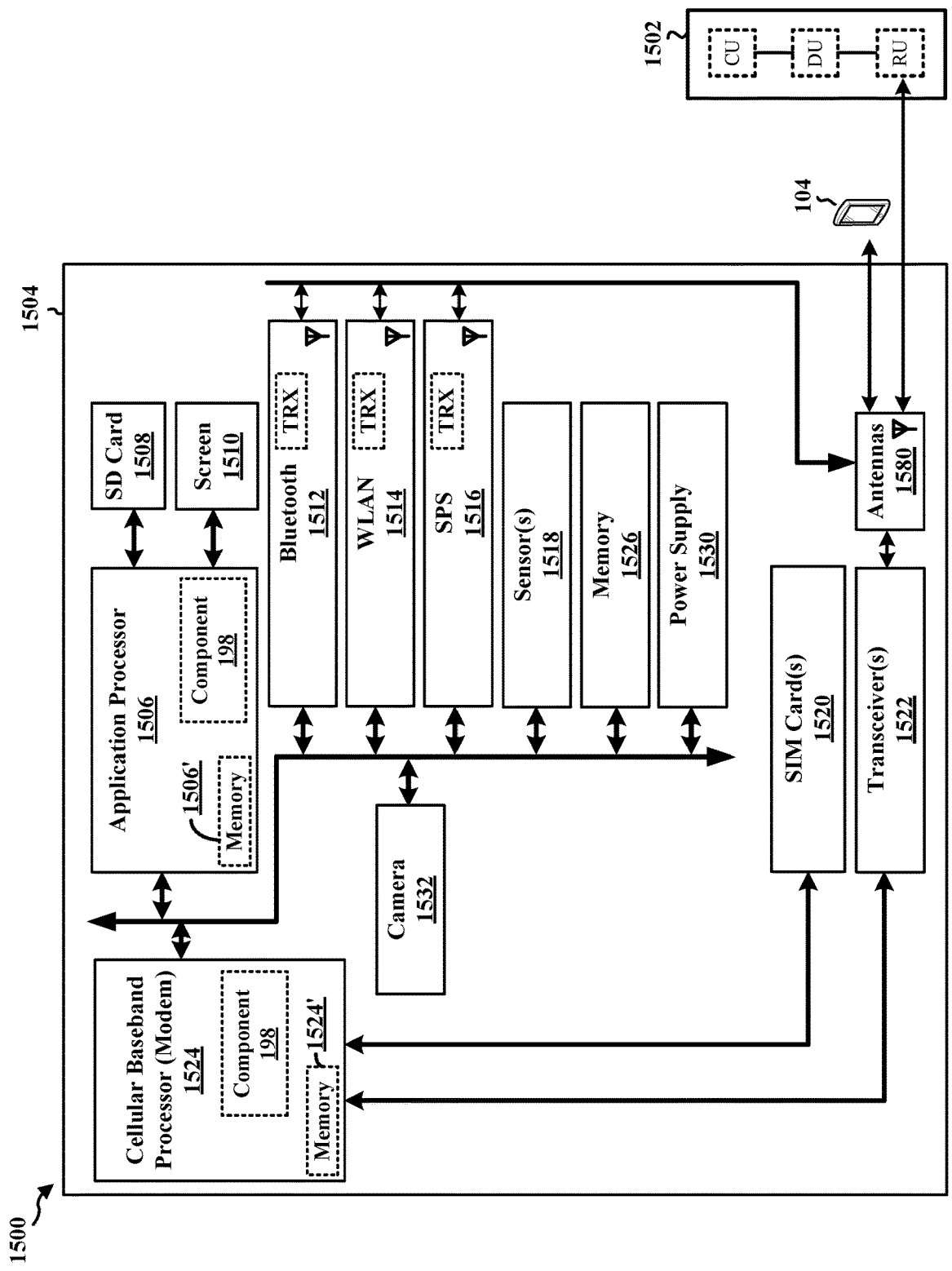
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, a satellite system module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the satellite system module 1516 may include an on-chip transceiver (TRX)/receiver (RX). The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described herein. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., sec 350 of FIG. 3) and include the additional modules of the apparatus 1504.

As discussed herein, the repetition component 198 may be configured to transmit, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. In some aspects, the repetition component 198 may be further configured to transmit, to the second network entity, the first PSSCH transmission including a first instance of sidelink information based on the frequency hopping pattern. In some aspects, the repetition component 198 may be further configured to transmit, to the second network entity, the second PSSCH transmission including a second instance of the sidelink information based on the frequency hopping pattern. The repetition component 198 may be within the cellular baseband processor 1524, the application processor 1506, or both the cellular baseband processor 1524 and the application processor 1506. The repetition component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for transmitting, to a second network entity, a repetition configuration associated with a first PSSCH transmission and a second PSSCH transmission, where the repetition configuration includes information indicative of a frequency hopping pattern associated with the first PSSCH transmission and the second PSSCH transmission. In some aspects, the apparatus 1504 may further include means for transmitting, to the second network entity, the first PSSCH transmission including a first instance of sidelink information based on the frequency hopping pattern. In some aspects, the apparatus 1504 may further include means for transmitting, to the second network entity, the second PSSCH transmission including a second instance of the sidelink information based on the frequency hopping pattern. In some aspects, the apparatus 1504 may further include means for transmitting the repetition configuration before SCI associated with the first PSSCH transmission. In some aspects, the apparatus 1504 may further include means for transmitting the repetition configuration with SCI associated with the first PSSCH transmission. In some aspects, the apparatus 1504 may further include means for transmitting the first PSSCH transmission in a first mini-slot or a first slot. In some aspects, the apparatus 1504 may further include means for transmitting the second PSSCH transmission in a second mini-slot or a second slot. In some aspects, the apparatus 1504 may further include means for receiving information indicative of a length associated with the switching time gap. In some aspects, the apparatus 1504 may further include means for transmitting the first PSSCH transmission in a first sub-RP of a sidelink RP. In some aspects, the apparatus 1504 may further include means for transmitting the second PSSCH transmission in a second sub-RP of the sidelink RP. In some aspects, the apparatus 1504 may further include means for puncturing or rate-matching a portion of the first instance of the sidelink information or the second instance of the sidelink information based on the switching time gap being configured to overlap with the portion. In some aspects, the apparatus 1504 may further include means for receiving DCI indicative of a CG or a DG associated with the first PSSCH transmission or the second PSSCH transmission. In some aspects, the apparatus 1504 may further include means for transmitting the first PSSCH transmission in a first sub-RP of a sidelink RP. In some aspects, the apparatus 1504 may further include means for transmitting the second PSSCH transmission in a second sub-RP of the sidelink RP. In some aspects, the apparatus 1504 may further include means for transmitting the first PSSCH transmission in a relative RB location in the first RP. In some aspects, the apparatus 1504 may further include means for transmitting the second PSSCH transmission in the relative RB location in the second sub-RP. In some aspects, the apparatus 1504 may further include means for transmitting the first PSSCH transmission based on a time domain RA. In some aspects, the apparatus 1504 may further include means for transmitting the second PSSCH transmission based on the time domain RA. In some aspects, the apparatus 1504 may further include means for receiving, from a third network entity, information indicative of the first sub-RP and the second sub-RP. In some aspects, the apparatus 1504 may further include means for transmitting, to the second network entity, information indicative of the first sub-RP and the second sub-RP. In some aspects, the apparatus 1504 may further include means for determining the first sub-RP based on a first index associated with the first sub-RP and determine the second sub-RP based on a second index associated with the second sub-RP. In some aspects, the apparatus 1504 may further include means for determining the first sub-RP based on a first time resource identifier associated with the first PSSCH transmission and determining the second sub-RP based on a second time resource identifier associated with the second PSSCH transmission. In some aspects, the apparatus 1504 may further include means for receiving, from a third network entity, information indicative of one or more allowed patterns. In some aspects, the apparatus 1504 may further include means for determining the frequency hopping pattern from one of the one or more allowed patterns. In some aspects, the apparatus 1504 may further include means for receiving, from the second network entity, measurement information based on sidelink reference signals (RSs) or a third PSSCH transmission. In some aspects, the apparatus 1504 may further include means for transmitting, to the second network entity, information indicative of a cancellation of the second instance of the sidelink information. In some aspects, the apparatus 1504 may further include means for receiving, from the second network entity, information indicative of energy harvesting. In some aspects, the apparatus 1504 may further include means for transmitting, to the second network entity based on the information indicative of energy harvesting, the second PSSCH transmission. In some aspects, the apparatus 1504 may further include means for determining the frequency hopping pattern. In some aspects, the apparatus 1504 may further include means for receiving, from a third network entity, the frequency hopping pattern. The means may be the repetition component 198 of the apparatus 1504 configured to perform the functions recited by the means. As described herein, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

Aspect 1 is a first network entity for wireless communication, including: a memory; and at least one processor coupled to the memory, where the at least one processor is configured to: transmit, to a second network entity, a repetition configuration associated with a first physical sidelink control channel (PSSCH) transmission and a second PSSCH transmission, where the repetition configuration includes information indicative of a frequency hopping pattern associated with the first PSSCH transmission and the second PSSCH transmission; transmit, to the second network entity, the first PSSCH transmission including a first instance of sidelink information based on the frequency hopping pattern; and transmit, to the second network entity, the second PSSCH transmission including a second instance of the sidelink information based on the frequency hopping pattern.

Aspect 2 is the first network entity of aspect 1, where, to transmit the repetition configuration, the at least one processor is configured to transmit the repetition configuration before sidelink control information (SCI) associated with the first PSSCH transmission.

Aspect 3 is the first network entity of aspect 1, where, to transmit the repetition configuration, the at least one processor is configured to transmit the repetition configuration with sidelink control information (SCI) associated with the first PSSCH transmission.

Aspect 4 is the first network entity of any of aspects 1-3, where, to transmit the first PSSCH transmission, the at least one processor is configured to transmit the first PSSCH transmission in a first mini-slot or a first slot; and to transmit the second PSSCH transmission, the at least one processor is configured to transmit the second PSSCH transmission in a second mini-slot or a second slot.

Aspect 5 is the first network entity of aspect 4, where an end of the first mini-slot or the first slot or a beginning of the second mini-slot or the second slot is configured to include a switching time gap.

Aspect 6 is the first network entity of aspect 5, where the at least one processor is configured to: receive information indicative of a length associated with the switching time gap.

Aspect 7 is the first network entity of any of aspects 5-6, where: to transmit the first PSSCH transmission, the at least one processor is configured to transmit the first PSSCH transmission in a first sub-resource pool (RP) of a sidelink RP; to transmit the second PSSCH transmission, the at least one processor is configured to transmit the second PSSCH transmission in a second sub-RP of the sidelink RP; and a length associated with the switching time gap is based on a first size or a first identifier associated with the first sub-RP, a second size or a second identifier associated with the second sub-RP, or a third identifier associated with the RP.

Aspect 8 is the first network entity of any of aspects 5-7, where the at least one processor is configured to: puncture or rate-match a portion of the first instance of the sidelink information or the second instance of the sidelink information based on the switching time gap being configured to overlap with the portion.

Aspect 9 is the first network entity of any of aspects 5-8, where a length associated with the switching time gap is based on an energy state associated with the second network entity.

Aspect 10 is the first network entity of any of aspects 1-3, where the at least one processor is configured to: receive downlink control information (DCI) indicative of a configured grant (CG) or a dynamic grant (DG) associated with the first PSSCH transmission or the second PSSCH transmission.

Aspect 11 is the first network entity of any of aspects 1-3, where, to transmit the first PSSCH transmission, the at least one processor is configured to transmit the first PSSCH transmission in a first sub-resource pool (RP) of a sidelink RP; and to transmit the second PSSCH transmission, the at least one processor is configured to transmit the second PSSCH transmission in a second sub-RP of the sidelink RP.

Aspect 12 is the first network entity of aspect 11, where, to transmit the first PSSCH transmission, the at least one processor is configured to transmit the first PSSCH transmission in a relative resource block (RB) location in the first RP; and to transmit the second PSSCH transmission, the at least one processor is configured to transmit the second PSSCH transmission in the relative RB location in the second sub-RP.

Aspect 13 is the first network entity of aspect 11, where, to transmit the first PSSCH transmission, the at least one processor is configured to transmit the first PSSCH transmission based on a time domain resource allocation (RA); and to transmit the second PSSCH transmission, the at least one processor is configured to transmit the second PSSCH transmission based on the time domain RA.

Aspect 14 is the first network entity of any of aspects 11-13, where the at least one processor is configured to: receive, from a third network entity, information indicative of the first sub-RP and the second sub-RP.

Aspect 15 is the first network entity of any of aspects 11-13, where the at least one processor is configured to: transmit, to the second network entity, information indicative of the first sub-RP and the second sub-RP.

Aspect 16 is the first network entity of any of aspects 11-13, where the at least one processor is configured to: determine the first sub-RP based on a first index associated with the first sub-RP and determine the second sub-RP based on a second index associated with the second sub-RP.

Aspect 17 is the first network entity of aspect 16, where a first one of the first index or the second index is a highest index associated with the sidelink RP, and where a second one of the first index or the second index is a lowest index associated with the sidelink RP.

Aspect 18 is the first network entity of aspect 11, where, to determine the first sub-RP and the second sub-RP, the at least one processor is configured to: determine the first sub-RP based on a first time resource identifier associated with the first PSSCH transmission and determine the second sub-RP based on a second time resource identifier associated with the second PSSCH transmission.

Aspect 19 is the first network entity of any of aspects 11-18, where the at least one processor is configured to: receive, from a third network entity, information indicative of one or more allowed patterns; and determine the frequency hopping pattern from one of the one or more allowed patterns.

Aspect 20 is the first network entity of aspect 19, where, to determine the frequency hopping pattern, the at least one processor is configured to: receive, from the second network entity, measurement information based on sidelink reference signals (RSs) or a third PSSCH transmission.

Aspect 21 is the first network entity of any of aspects 11-20, where the at least one processor is configured to: transmit, to the second network entity, information indicative of a cancellation of the second instance of the sidelink information.

Aspect 22 is the first network entity of any of aspects 11-21, where the at least one processor is configured to: receive, from the second network entity, information indicative of energy harvesting; and transmit, to the second network entity based on the information indicative of the energy harvesting, the second PSSCH transmission.

Aspect 23 is the first network entity of any of aspects 11-22, where the frequency hopping pattern is indicative of an allowed frequency hopping pattern associated with the first PSSCH transmission and the second PSSCH transmission.

Aspect 24 is the first network entity of aspect 23, where the allowed frequency hopping pattern is based on a bandwidth switch capability associated with the second network entity.

Aspect 25 is the first network entity of any of aspects 11-24, where the at least one processor is configured to: determine the frequency hopping pattern; or receive, from a third network entity, the frequency hopping pattern.

Aspect 26 is a method of wireless communication for implementing any of aspects 1 to 10.

Aspect 27 is an apparatus for wireless communication including means for implementing any of aspects 1 to 10.

Aspect 28 is a computer-readable medium (e.g., a non-transitory computer-readable medium) having code stored thereon that, when executed by an apparatus, causes the apparatus to implement any of aspects 1 to 10.

Aspect 29 is a method of wireless communication for implementing any of aspects 11 to 25.

Aspect 30 is an apparatus for wireless communication including means for implementing any of aspects 11 to 25.

Aspect 31 is a computer-readable medium (e.g., a non-transitory computer-readable medium) having code stored thereon that, when executed by an apparatus, causes the apparatus to implement any of aspects 11 to 25.

What is claimed is:

1. A first network entity for wireless communication, comprising:
   a memory; and
   at least one processor coupled to the memory, wherein the at least one processor is configured to:
   transmit, to a second network entity, a repetition configuration associated with a first physical sidelink control channel (PSSCH) transmission and a second PSSCH transmission, wherein the repetition configuration comprises information indicative of a frequency hopping pattern associated with the first PSSCH transmission and the second PSSCH transmission;
   transmit, to the second network entity, the first PSSCH transmission including a first instance of sidelink information based on the frequency hopping pattern; and
   transmit, to the second network entity, the second PSSCH transmission including a second instance of the sidelink information based on the frequency hopping pattern.

2. The first network entity of claim 1, wherein, to transmit the repetition configuration, the at least one processor is configured to transmit the repetition configuration before sidelink control information (SCI) associated with the first PSSCH transmission.

3. The first network entity of claim 1, wherein, to transmit the repetition configuration, the at least one processor is configured to transmit the repetition configuration with sidelink control information (SCI) associated with the first PSSCH transmission.

4. The first network entity of claim 1, wherein,
   to transmit the first PSSCH transmission, the at least one processor is configured to transmit the first PSSCH transmission in a first mini-slot or a first slot; and
   to transmit the second PSSCH transmission, the at least one processor is configured to transmit the second PSSCH transmission in a second mini-slot or a second slot.

5. The first network entity of claim 4, wherein an end of the first mini-slot or the first slot or a beginning of the second mini-slot or the second slot is configured to include a switching time gap.

6. The first network entity of claim 5, wherein the at least one processor is configured to:
   receive information indicative of a length associated with the switching time gap.

7. The first network entity of claim 5, wherein:
   to transmit the first PSSCH transmission, the at least one processor is configured to transmit the first PSSCH transmission in a first sub-resource pool (RP) of a sidelink RP;
   to transmit the second PSSCH transmission, the at least one processor is configured to transmit the second PSSCH transmission in a second sub-RP of the sidelink RP; and
   a length associated with the switching time gap is based on a first size or a first identifier associated with the first sub-RP, a second size or a second identifier associated with the second sub-RP, or a third identifier associated with the RP.

8. The first network entity of claim 5, wherein the at least one processor is configured to:
   puncture or rate-match a portion of the first instance of the sidelink information or the second instance of the sidelink information based on the switching time gap being configured to overlap with the portion.

9. The first network entity of claim 5, wherein a length associated with the switching time gap is based on an energy state associated with the second network entity.

10. The first network entity of claim 1, wherein the at least one processor is configured to:
    receive downlink control information (DCI) indicative of a configured grant (CG) or a dynamic grant (DG) associated with the first PSSCH transmission or the second PSSCH transmission.

11. The first network entity of claim 1, wherein,
    to transmit the first PSSCH transmission, the at least one processor is configured to transmit the first PSSCH transmission in a first sub-resource pool (RP) of a sidelink RP; and
    to transmit the second PSSCH transmission, the at least one processor is configured to transmit the second PSSCH transmission in a second sub-RP of the sidelink RP.

12. The first network entity of claim 11, wherein,
    to transmit the first PSSCH transmission, the at least one processor is configured to transmit the first PSSCH transmission in a relative resource block (RB) location in the first RP; and
    to transmit the second PSSCH transmission, the at least one processor is configured to transmit the second PSSCH transmission in the relative RB location in the second sub-RP.

13. The first network entity of claim 11, wherein,
    to transmit the first PSSCH transmission, the at least one processor is configured to transmit the first PSSCH transmission based on a time domain resource allocation (RA); and
    to transmit the second PSSCH transmission, the at least one processor is configured to transmit the second PSSCH transmission based on the time domain RA.

14. The first network entity of claim 11, wherein the at least one processor is configured to:
    receive, from a third network entity, information indicative of the first sub-RP and the second sub-RP.

15. The first network entity of claim 11, wherein the at least one processor is configured to:
    transmit, to the second network entity, information indicative of the first sub-RP and the second sub-RP.

16. The first network entity of claim 11, wherein the at least one processor is configured to:
    determine the first sub-RP based on a first index associated with the first sub-RP and determine the second sub-RP based on a second index associated with the second sub-RP.

17. The first network entity of claim 16, wherein a first one of the first index or the second index is a highest index associated with the sidelink RP, and wherein a second one of the first index or the second index is a lowest index associated with the sidelink RP.

18. The first network entity of claim 11, wherein, to determine the first sub-RP and the second sub-RP, the at least one processor is configured to:

determine the first sub-RP based on a first time resource identifier associated with the first PSSCH transmission and determine the second sub-RP based on a second time resource identifier associated with the second PSSCH transmission.

19. The first network entity of claim 11, wherein the at least one processor is configured to:
   receive, from a third network entity, information indicative of one or more allowed patterns; and
   determine the frequency hopping pattern from one of the one or more allowed patterns.

20. The first network entity of claim 19, wherein, to determine the frequency hopping pattern, the at least one processor is configured to:
   receive, from the second network entity, measurement information based on sidelink reference signals (RSs) or a third PSSCH transmission.

21. The first network entity of claim 1, wherein the at least one processor is configured to:
   transmit, to the second network entity, information indicative of a cancellation of the second instance of the sidelink information.

22. The first network entity of claim 1, wherein the at least one processor is configured to:
   receive, from the second network entity, information indicative of energy harvesting; and
   transmit, to the second network entity based on the information indicative of the energy harvesting, the second PSSCH transmission.

23. The first network entity of claim 1, wherein the frequency hopping pattern is indicative of an allowed frequency hopping pattern associated with the first PSSCH transmission and the second PSSCH transmission.

24. The first network entity of claim 23, wherein the allowed frequency hopping pattern is based on a bandwidth switch capability associated with the second network entity.

25. The first network entity of claim 1, wherein the at least one processor is configured to:
   determine the frequency hopping pattern; or
   receive, from a third network entity, the frequency hopping pattern.

26. A method for wireless communication performed by a first network entity, comprising:
   transmitting, to a second network entity, a repetition configuration associated with a first physical sidelink control channel (PSSCH) transmission and a second PSSCH transmission, wherein the repetition configuration comprises information indicative of a frequency hopping pattern associated with the first PSSCH transmission and the second PSSCH transmission;
   transmitting, to the second network entity, the first PSSCH transmission including a first instance of sidelink information based on the frequency hopping pattern; and
   transmitting, to the second network entity, the second PSSCH transmission including a second instance of the sidelink information based on the frequency hopping pattern.

27. The method of claim 26, wherein transmitting the repetition configuration further comprises transmitting the repetition configuration before sidelink control information (SCI) associated with the first PSSCH transmission.

28. The method of claim 26, wherein transmitting the repetition configuration further comprises transmitting the repetition configuration with sidelink control information (SCI) associated with the first PSSCH transmission.

29. A first network entity for wireless communication, comprising:
   means for transmitting, to a second network entity, a repetition configuration associated with a first physical sidelink control channel (PSSCH) transmission and a second PSSCH transmission, wherein the repetition configuration comprises information indicative of a frequency hopping pattern associated with the first PSSCH transmission and the second PSSCH transmission;
   means for transmitting, to the second network entity, the first PSSCH transmission including a first instance of sidelink information based on the frequency hopping pattern; and
   means for transmitting, to the second network entity, the second PSSCH transmission including a second instance of the sidelink information based on the frequency hopping pattern.

30. A non-transitory computer-readable medium having code stored thereon that, when executed by an apparatus, causes the apparatus to perform operations, comprising:
   transmitting, to a second network entity, a repetition configuration associated with a first physical sidelink control channel (PSSCH) transmission and a second PSSCH transmission, wherein the repetition configuration comprises information indicative of a frequency hopping pattern associated with the first PSSCH transmission and the second PSSCH transmission;
   transmitting, to the second network entity, the first PSSCH transmission including a first instance of sidelink information based on the frequency hopping pattern; and
   transmitting, to the second network entity, the second PSSCH transmission including a second instance of the sidelink information based on the frequency hopping pattern.

* * * * *